US011954665B2

(12) United States Patent
Imura

(10) Patent No.: US 11,954,665 B2
(45) Date of Patent: Apr. 9, 2024

(54) PAYMENT SYSTEM, PAYMENT METHOD, AND INFORMATION STORAGE MEDIUM

(71) Applicant: Rakuten Group, Inc., Tokyo (JP)

(72) Inventor: Ayaka Imura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 114 days.

(21) Appl. No.: 17/689,401

(22) Filed: Mar. 8, 2022

(65) Prior Publication Data

US 2022/0292481 A1    Sep. 15, 2022

(30) Foreign Application Priority Data

Mar. 9, 2021  (JP) .................................. 2021-037436

(51) Int. Cl.
 *G06Q 20/22* (2012.01)
 *G06Q 20/06* (2012.01)
 *G06Q 20/10* (2012.01)

(52) U.S. Cl.
 CPC ......... *G06Q 20/227* (2013.01); *G06Q 20/065* (2013.01); *G06Q 20/10* (2013.01)

(58) Field of Classification Search
 CPC .................................................. G06Q 20/227
 See application file for complete search history.

(56) References Cited

U.S. PATENT DOCUMENTS 11,423,384 B1 *   8/2022  Philbrick ............... G06Q 30/08
2012/0122065 A1 * 5/2012  Purfallah ............. G06Q 20/102

2016/0232506 A1   8/2016  Gotanda et al.
2018/0218349 A1 * 8/2018  Gotunda ................ G06Q 20/20
2021/0166234 A1 * 6/2021  Anderson .............. G06Q 20/40
2021/0256517 A1 * 8/2021  Madan ................... G06Q 20/40
2021/0365931 A1  11/2021  Shinohara

FOREIGN PATENT DOCUMENTS

| JP | 2009-98928 A | 5/2009 |
| JP | 2014-106752 A | 6/2014 |
| JP | 2016-146008 A | 8/2016 |
| JP | 2016-184247 A | 10/2016 |
| JP | WO2018042533 A1 | 3/2018 |

OTHER PUBLICATIONS

Noh, S., et al., in "Proposed M-Payment System Using Near-Field Communication and Based on WSN-Enabled Location-Based Services for M-Commerce" in International Journal of Distributed Sensor Networks (Year: 2014).*
Office Action dated May 31, 2022 issued by the Japanese Patent Office in Japanese Application No. 2021-037436.

* cited by examiner

*Primary Examiner* — Olabode Akintola
*Assistant Examiner* — Brandon M Duck
(74) *Attorney, Agent, or Firm* — Sughrue Mion, PLLC

(57) ABSTRACT

Provided is a payment system including at least one processor configured to: reserve, before a payment request for first payment means is received, at least one second payment means associated with the first payment means; receive the payment request; and execute, when the payment request is received, payment based on the first payment means and the at least one second payment means.

16 Claims, 17 Drawing Sheets

FIG.6

| ELECTRONIC MONEY ID | COMBINATION SETTINGS DB1 | | |
|---|---|---|---|
| | ORDER OF PRECEDENCE | PAYMENT MEANS | UPPER LIMIT |
| a00001 | 1 | ELECTRONIC CASH B b00001 | 3000 |
| | 2 | POINTS C c00001 | 500 |
| a00002 | 1 | ELECTRONIC CASH B b00002 | 4500 |
| a00003 | 1 | POINTS C c00003 | 2000 |
| | 2 | ELECTRONIC CASH B b00003 | 1500 |
| ⋮ | ⋮ | ⋮ | ⋮ |

FIG.7

| STORE ID | ELECTRONIC MONEY ID | RESERVATION INFORMATION DB2 | | | EXPIRATION TIME |
|---|---|---|---|---|---|
| | | ORDER OF PRECEDENCE | PAYMENT MEANS | RESERVED AMOUNT | |
| s00001 | a00001 | 1 | ELECTRONIC CASH B b00001 | 3000 | 2021/3/5 18:15:00 |
| | | 2 | POINTS C c00001 | 500 | |
| s00005 | a00002 | 1 | ELECTRONIC CASH B b00002 | 4500 | 2021/3/5 18:17:25 |
| s00007 | a00003 | 1 | POINTS C c00003 | 2000 | 2021/3/5 18:19:40 |
| | | 2 | ELECTRONIC CASH B b00003 | 1500 | |
| ⋮ | ⋮ | ⋮ | ⋮ | ⋮ | ⋮ |

| ELECTRONIC MONEY ID | BALANCE | USAGE HISTORY | | |
|---|---|---|---|---|
| | | DATE AND TIME OF USE | LOCATION OF USE | USED AMOUNT |
| a00001 | 2540 | 2021/2/12 10:02:35 | SUPERMARKET X | 2500 |
| | | 2021/2/13 19:25:22 | SUPERMARKET X | 1980 |
| | | 2021/2/13 21:04:05 | CONVENIENCE STORE Y | 326 |
| | | ⋮ | ⋮ | ⋮ |
| a00002 | 6825 | 2021/2/5 20:35:01 | KIOSK Z | 250 |
| | | 2021/2/8 08:11:42 | KIOSK Z | 140 |
| | | 2021/2/12 15:07:25 | CONVENIENCE STORE Y | 650 |
| | | ⋮ | ⋮ | ⋮ |
| a00003 | 1290 | 2021/2/11 09:52:14 | CONVENIENCE STORE Y | 260 |
| | | 2021/2/12 19:11:15 | SUPERMARKET X | 750 |
| | | 2021/2/13 19:25:32 | SUPERMARKET X | 1625 |
| | | ⋮ | ⋮ | ⋮ |
| ⋮ | ⋮ | ⋮ | ⋮ | ⋮ |

| ELECTRONIC CASH ID | BALANCE | RESERVED AMOUNT |
|---|---|---|
| b00001 | 14200 | 3000 |
| b00002 | 8455 | 4500 |
| b00003 | 6620 | 1500 |
| ⋮ | ⋮ | ⋮ |

| POINT ID | BALANCE | RESERVED AMOUNT |
|---|---|---|
| b00001 | 2500 | 500 |
| b00002 | 340 | – |
| b00003 | 5000 | 2000 |
| ... | ... | ... |

| DATE AND TIME OF USE |
|---|
| 2021/2/12 17:02:35 |
| 2021/2/13 17:45:22 |
| 2021/2/15 17:24:31 |
| 2021/2/17 17:15:51 |
| 2021/2/18 17:30:06 |
| 2021/2/19 18:02:12 |
| ⋮ |

PREDICTED TIME OF USE 17:25:00

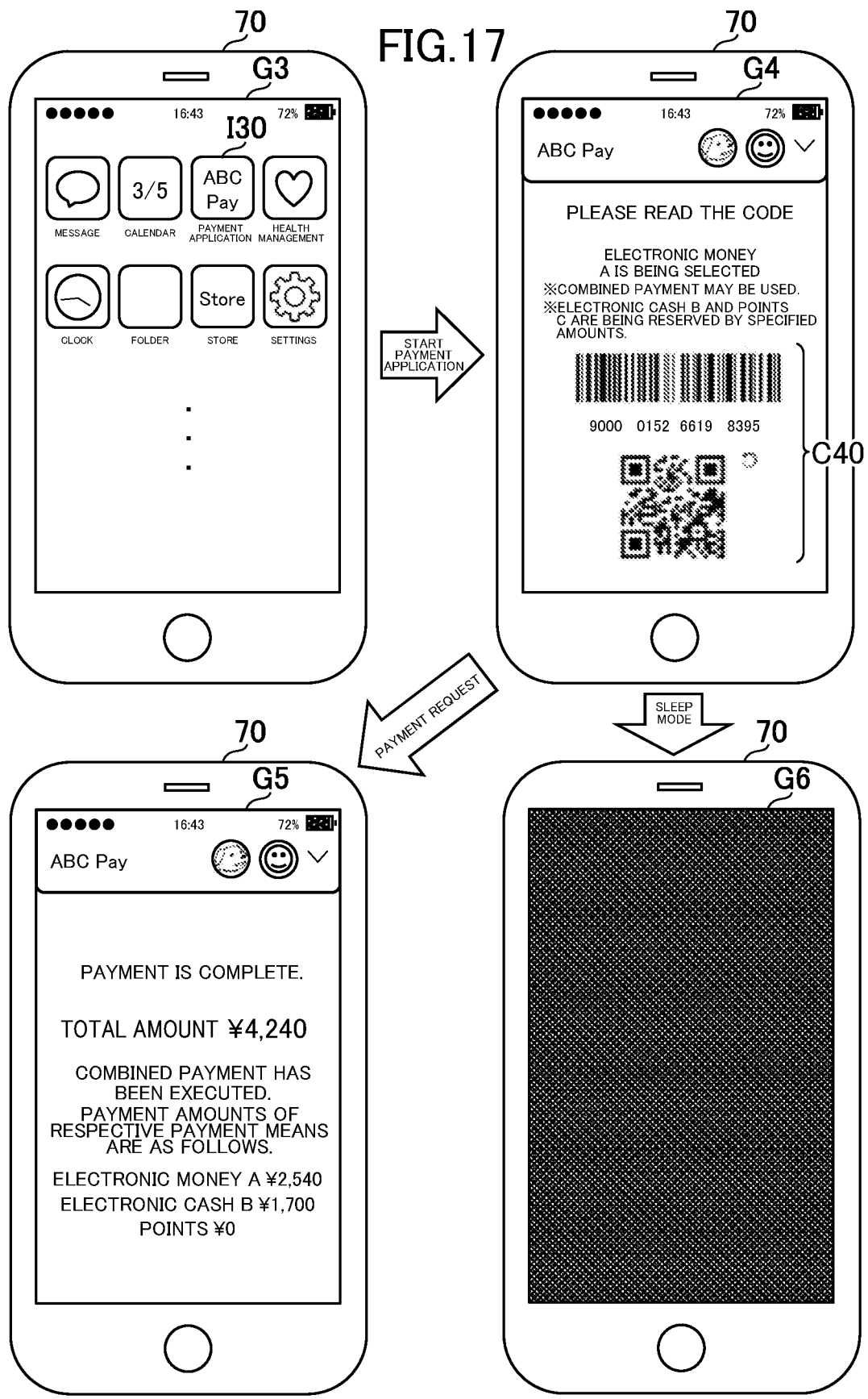

PAYMENT SYSTEM, PAYMENT METHOD, AND INFORMATION STORAGE MEDIUM

CROSS-REFERENCE TO RELATED APPLICATION

The present application claims priority from Japanese application JP 2021-037436 filed on Mar. 9, 2021, the content of which is hereby incorporated by reference into this application.

BACKGROUND OF THE INVENTION

1. Field of the Invention

The present disclosure relates to a payment system, a payment method, and an information storage medium.

2. Description of the Related Art

Hitherto, there have been various payment means, such as electronic moneys and points, as electronic payment means. For example, in JP 2016-146008 A, there is described a semi-self checkout system with which, even after data relating to a commodity to be purchased by a user is input to a POS terminal, an electronic money of the user can be charged before settlement relating to the commodity is executed.

SUMMARY OF THE INVENTION

However, with the technology of JP 2016-146008 A, it is required for the user to perform charging operation by himself or herself. Thus, for a user who is unfamiliar with the charging operation, it takes time to complete the payment. If the user does not know the charging operation, it is required for the user to call staff to have the charging operation performed, and it takes more time to complete the payment.

It is an object of the present disclosure to complete payment swiftly.

According to at least one embodiment of the present disclosure, there is provided a payment system including at least one processor configured to: reserve, before a payment request for first payment means is received, at least one second payment means associated with the first payment means; receive the payment request; and execute, when the payment request is received, payment based on the first payment means and the at least one second payment means.

BRIEF DESCRIPTION OF THE DRAWINGS

FIG. 6 is a table for showing a data storage example of a user database.

FIG. 7 is a table for showing a data storage example of a reservation information database.

FIG. 8 is a table for showing a data storage example of an electronic money database.

FIG. 9 is a table for showing a data storage example of an electronic cash database.

FIG. 10 is a table for showing a data storage example of a point database.

FIG. 17 is a diagram for illustrating an example of how the user uses the combined payment via a payment application.

DETAILED DESCRIPTION OF THE INVENTION

1. Overall Configuration of Payment System

Description is given of an example of a payment system according to at least one embodiment of the present disclosure. In the at least one embodiment, description is given of processing of the payment system taking as an example a situation in which a user does his or her shopping at a real store. A supermarket is taken as an example of a store, but the store may be of any type, for example, a convenience store, a shopping mall, a department store, a restaurant, or a kiosk at a transportation facility. The store is not limited to a stationary store, but may be a mobile store. The store is not limited to a real store, but may be a virtual store on the Internet.

Figure 1:
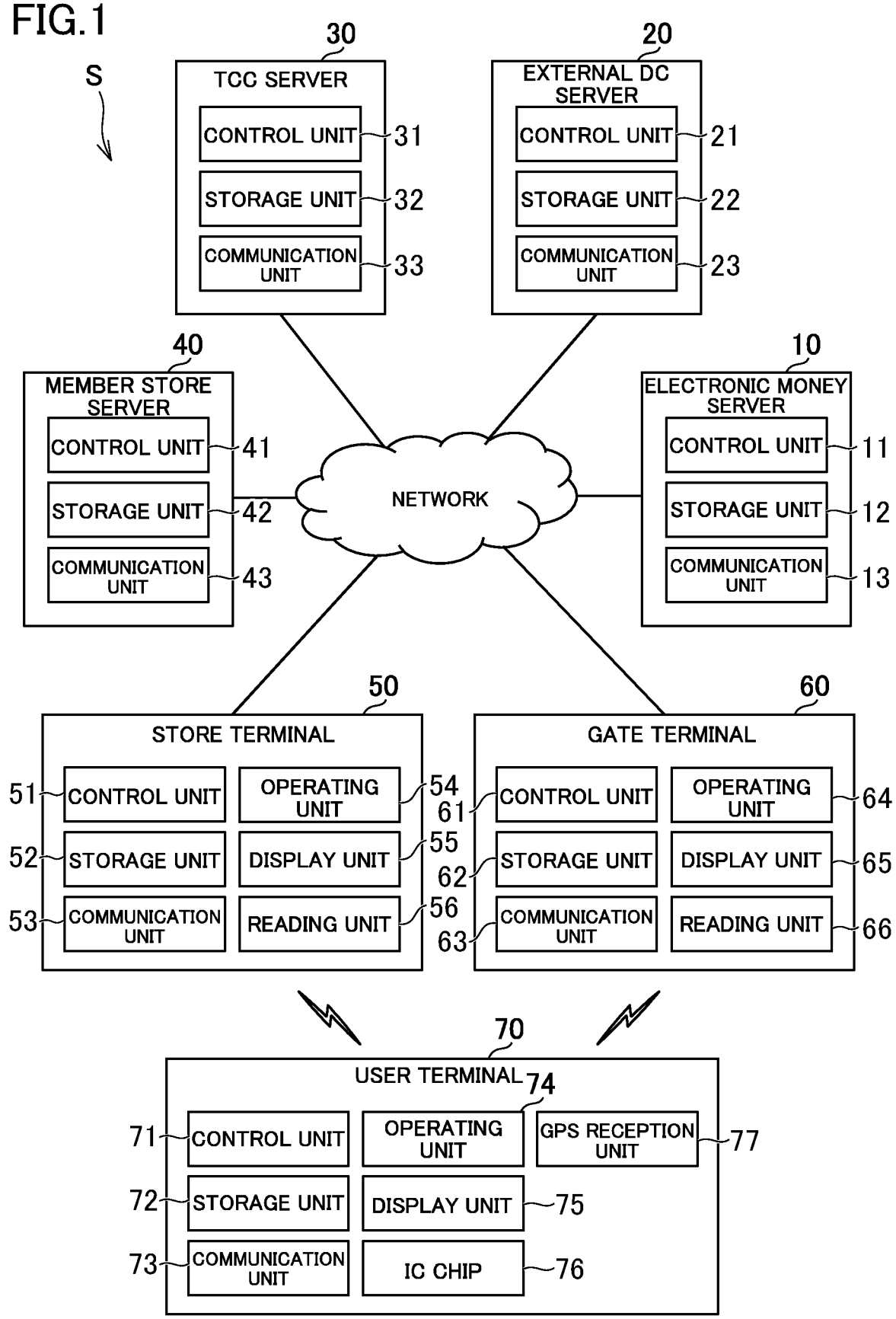
FIG. 1 is a diagram for illustrating an example of an overall configuration of a payment system.

FIG. 1 is a diagram for illustrating an example of an overall configuration of the payment system. As illustrated in FIG. 1, a payment system S includes an electronic money server 10, an external data center (DC) server 20, a thin client center (TCC) server 30, a member store server 40, a store terminal 50, a gate terminal 60, and a user terminal 70. Those computers are connectable to a network, such as a LAN or the Internet. It is only required that the payment system S include at least one computer, and the payment system S is not limited to the example of FIG. 1.

The electronic money server 10 is a server computer which manages at least one payment means. The payment means is means used in electronic payment. As the payment means itself, various publicly known means can be used, and may be, for example, an electronic money, electronic cash, points, a virtual currency, a credit card, or a debit card. In addition, for example, payment means using a barcode or a two-dimensional code, payment means using near-field wireless communication, payment means called wallet, payment means called a gift or a bonus, or payment means using an account such as a bank account can be used. The payment means is not limited to means with a balance or an upper limit, but may be means without the concept of the balance or the upper limit. The payment means with the balance also includes means called "electronic value."

For example, the electronic money server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The external DC server 20 is a server computer which manages data on at least one payment means. In the at least one embodiment, with the external DC server 20 provided between the electronic money server 10 and the TCC server 30, a one-to-one relationship between the electronic money server 10 and the member store server 40 is not required. With this configuration, an amount of data to be managed on the electronic money server 10 side can be reduced, and individual support in introducing a payment method according to the at least one embodiment can be unnecessitated. The external DC server 20 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively.

The TCC server 30 is a server computer which executes main processing on the store side. With the provision of the TCC server 30, processing to be executed by the member store server 40 is reduced, and the payment method according to the at least one embodiment is introduced more easily. The TCC server 30 includes a control unit 31, a storage unit 32, and a communication unit 33. Physical configurations of the control unit 31, the storage unit 32, and the communication unit 33 may be the same as those of the control unit 11, the storage unit 12, and the communication unit 13, respectively.

The member store server 40 is a server computer managed by a member store. A member store is a corporation which manages the store at which the payment method according to the at least one embodiment can be used. The member store manages at least one store, and there are a store terminal 50 and a gate terminal for each individual store. The member store server 40 includes a control unit 41, a storage unit 42, and a communication unit 43. Physical configurations of the control unit 41, the storage unit 42, and the communication unit 43 may be the same as those of the control unit 11, the storage unit 12, and the communication unit 13, respectively.

The store terminal 50 is a computer operated at the store. For example, the store terminal 50 is a POS terminal, a settlement machine, a personal computer, or a tablet type computer. The store terminal 50 includes a control unit 51, a storage unit 52, a communication unit 53, an operating unit 54, a display unit 55, and a reading unit 56. Physical configurations of the control unit 51, the storage unit 52, and the communication unit 53 are the same as those of the control unit 11, the storage unit 12, and the communication unit 13, respectively.

The operating unit 54 is an input device such as a touch panel. The display unit 55 is a liquid crystal display or an organic EL display. The reading unit 56 is a device which can read an IC chip 76 through near-field wireless communication. The reading unit 56 itself may be any device compatible with specifications of the IC chip 76, and a publicly known device is applicable to the reading unit 56. The reading unit 56 may be a reader/writer which can write data into the IC chip 76. The reading unit 56 may be connected as an external device to the store terminal 50.

The gate terminal 60 is a computer for managing at least one of entry or exit. The gate terminal 60 is sometimes also called a flapper gate. For example, the gate terminal 60 includes a control unit 61, a storage unit 62, a communication unit 63, an operating unit 64, a display unit 65, and a reading unit 66. Physical configurations of the control unit 61, the storage unit 62, the communication unit 63, the operating unit 64, the display unit 65, and the reading unit 66 may be the same as those of the control unit 11, the storage unit 12, the communication unit 13, the operating unit 54, the display unit 55, and the reading unit 56, respectively. The reading unit 66 may be connected as an external device to the gate terminal 60.

The user terminal 70 is a computer operated by the user. For example, the user terminal 70 is a smartphone, a tablet computer, a wearable terminal, or a personal computer. The user terminal 70 includes a control unit 71, a storage unit 72, a communication unit 73, an operating unit 74, a display unit 75, the IC chip 76, and a GPS reception unit 77. Physical configurations of the control unit 71, the storage unit 72, the communication unit 73, the operating unit 74, and the display unit 75 may be the same as those of the control unit 11, the storage unit 12, the communication unit 13, the operating unit 54, and the display unit 55, respectively.

The IC chip 76 may be a chip of any standards, for example, a chip of FeliCa (trademark) or a chip of a so-called Type A or Type B among the non-contact type standards. The IC chip 76 includes an antenna compatible with the standards, and stores, for example, various kinds of information on the payment means to be used by a user. The GPS reception unit 77 includes a receiver which receives signals from satellites. The GPS reception unit 77 is used to acquire a current position and a current date and time.

At least one of programs or data stored in the storage units 12, 22, 32, 42, 52, 62, and 72 may be supplied thereto via the network. Further, each of the computers may include at least one of a reading unit (for example, an optical disc drive or a memory card slot) for reading a computer-readable information storage medium, or an input/output unit (for example, a USB port) for inputting and outputting data to/from an external device. For example, at least one of the program or the data stored in the information storage medium may be supplied through intermediation of at least one of the reading unit or the input/output unit.

2. Outline of Payment System

In the at least one embodiment, a situation in which a user does his or her shopping at a store with use of an electronic money stored in the IC chip 76 is taken as an example. The user can use electronic cash and points in addition to the electronic money. The electronic cash is one type of electronic moneys that can be used online. The points are a bonus given to the user through use of the electronic money or electronic commerce, for example. The electronic cash and the points may be usable from the user terminal 70, or may be usable not from the user terminal 70 but from another medium such as a physical card (IC card or magnetic card).

When a balance of the electronic money is short, the user can execute payment in which at least one of the electronic cash or the points is used in combination. In the at least one embodiment, that payment method is described as "combined payment." The combined payment may be usable as a default function for all users, but in the at least one embodiment, the combined payment becomes usable after the user makes predetermined settings. For example, the user makes the settings for the combined payment via a browser or an electronic payment application on the user terminal 70.

Figure 2:
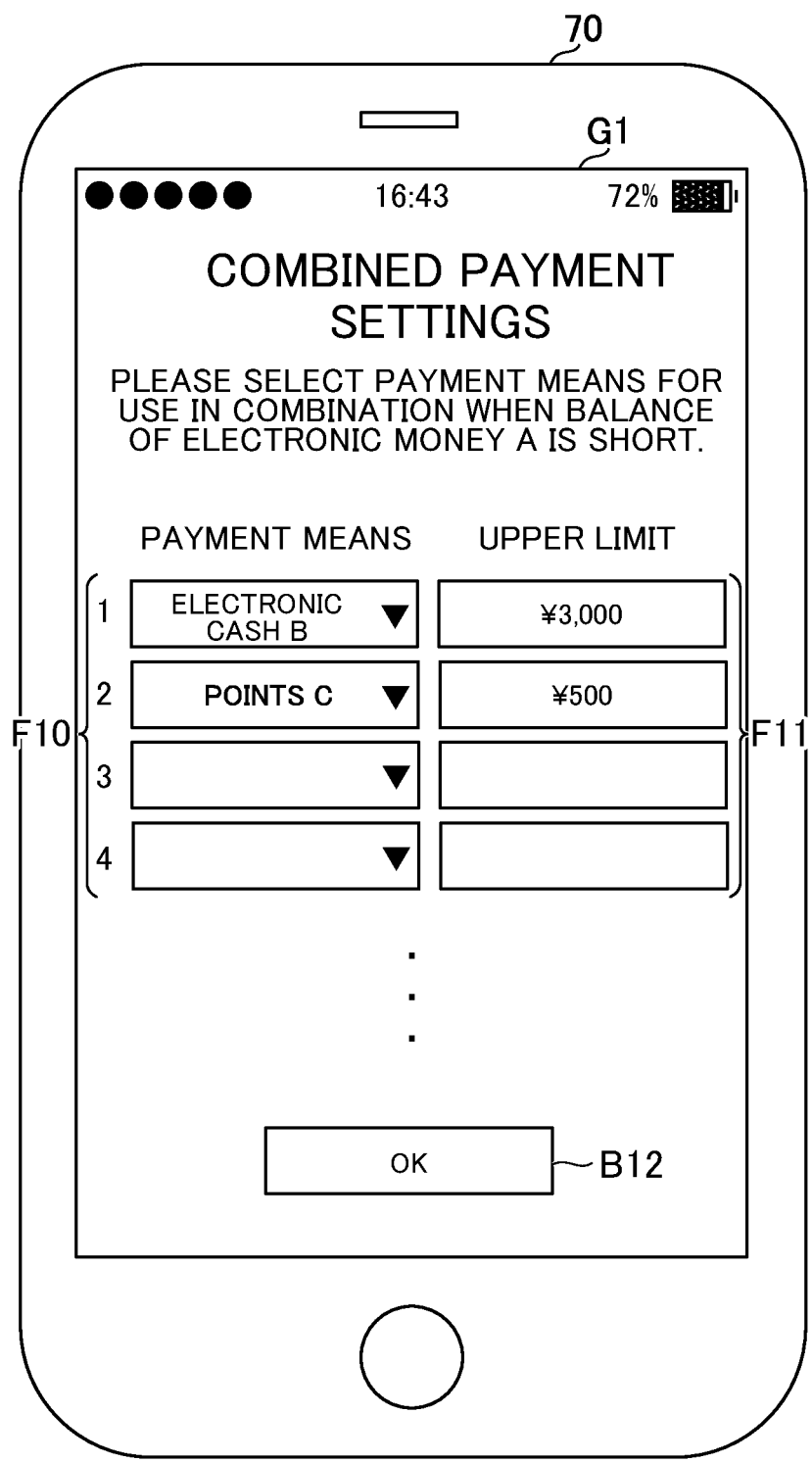
FIG. 2 is a diagram for illustrating an example of a setting screen for making settings for combined payment.

FIG. 2 is a diagram for illustrating an example of a setting screen for making settings for the combined payment. As illustrated in FIG. 2, on a setting screen G1 of the user terminal 70, an input form F10 for specifying at least one payment means for use in combination with the electronic money, an input form F11 for specifying an upper limit for each individual payment means in the combined payment, and a button B12 for completing the settings for the combined payment are displayed.

When the user specifies a plurality of payment means via the setting screen G1, the user can also specify the order of precedence of the individual payment means. In the example of FIG. 2, the electronic cash is specified as payment means that is 1st in order of precedence. As an upper limit of the electronic cash in the combined payment, 3,000 yen is specified. As payment means that is 2nd in order of precedence, the points are specified. As an upper limit of the points in the combined payment, 500 yen is specified. When the user selects the button B12, the settings for the combined payment are complete, and the user is enabled to use the combined payment.

Figure 3:
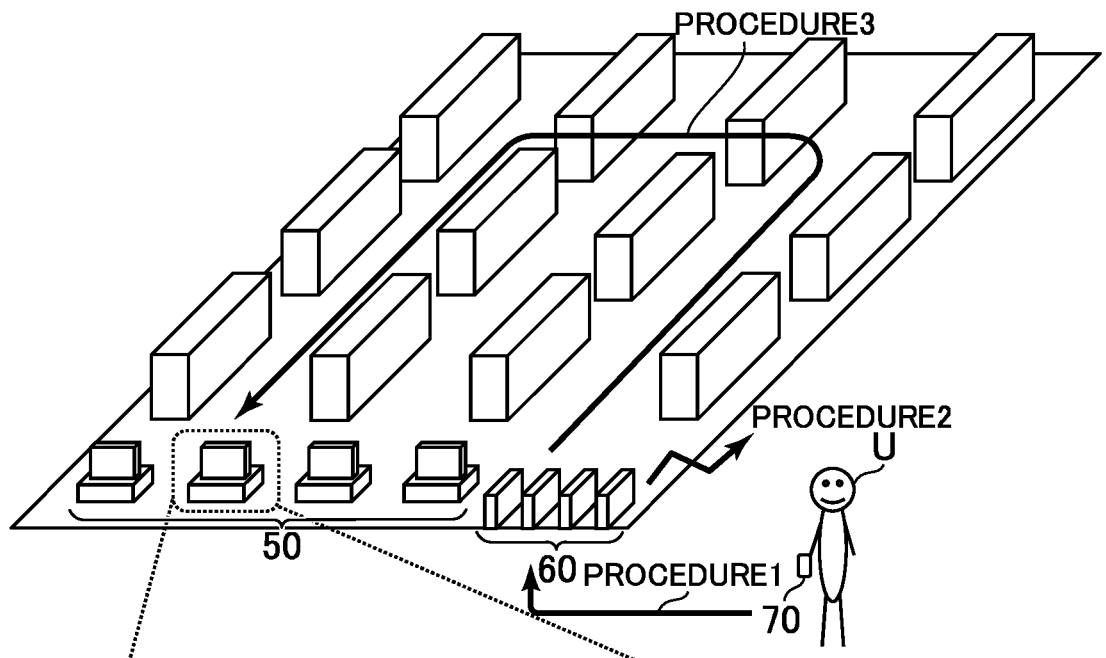
FIG. 3 is a diagram for illustrating an example of how a user uses the combined payment at a store.
Figure 3:
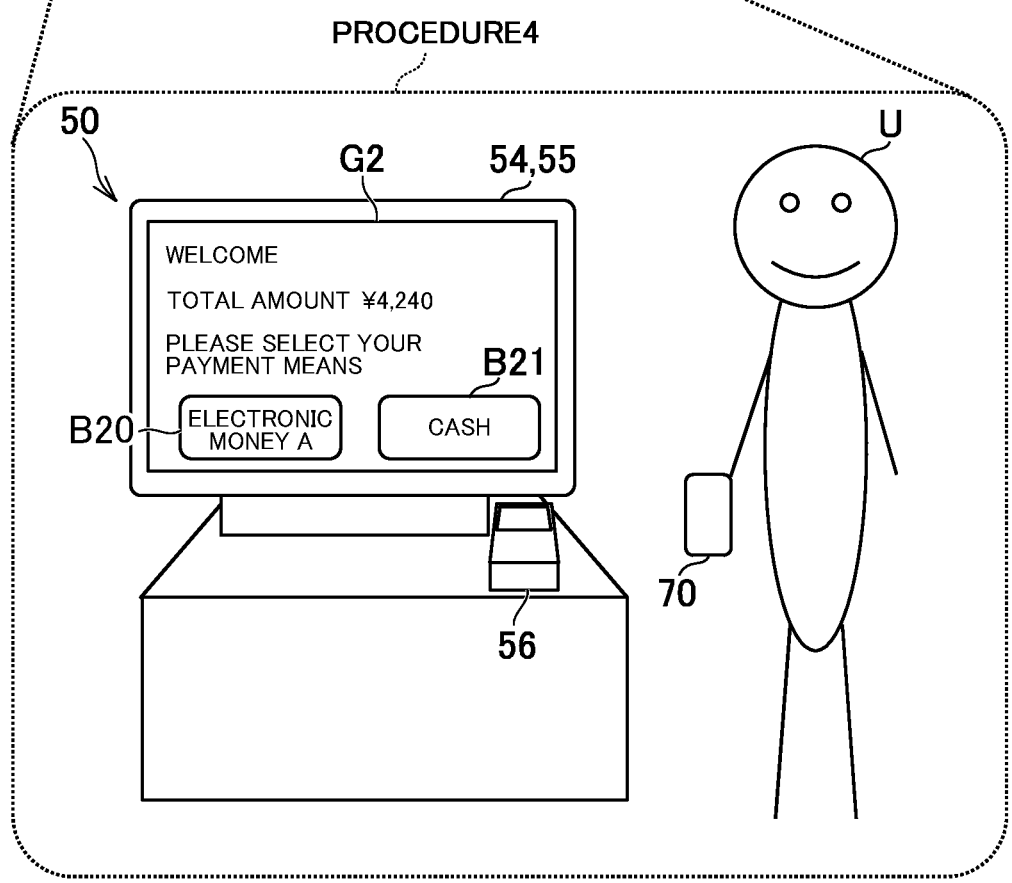

FIG. 3 is a diagram for illustrating an example of how the user uses the combined payment at a store. FIG. 3 shows an appearance of the store in which the store terminal 50 and the gate terminal 60 are arranged while omitting the member store server 40. The member store server 40 may be arranged in the store, or may be arranged at a remote location. As illustrated in FIG. 3, when a user U visits the store after completing the settings for the combined payment, the user U holds the user terminal 70 over the gate terminal 60 arranged near an entrance of the store (Procedure 1 of FIG. 3).

The term "holding over" as used in the at least one embodiment means not only bringing closer so that near-field wireless communication can be performed, but also making a physical contact. Thus, touching the gate terminal 60 with the user terminal 70 also corresponds to "holding over". The gate terminal 60 reads, out of the IC chip 76 of the user terminal 70, an electronic money ID with which a user in an electronic money service can be identified. The gate terminal 60 transmits, to the member store server 40, an entry notification indicating that the user U has entered the store based on the read electronic money ID (Procedure 2 of FIG. 3).

The member store server 40 transfers the entry notification to the electronic money server 10 via the TCC server 30 and the external DC server 20. When the entry notification is received, the electronic money server 10 reserves the electronic cash and the points of the user U by those upper limits, respectively. The reserved amounts of the electronic cash and the points cannot be used for other purposes until the payment at the store is complete or the user U exits the store.

Through the reservation of the electronic cash and the points, the respective upper limits specified by the user can be used reliably for the combined payment. Further, although details are to be described later, information on the reserved electronic cash and points is transmitted to, and is held by, the member store server 40. With this configuration, even when a failure occurs in the electronic money server 10 or on the network, the combined payment can be made as long as no failure occurs on the member store server 40 side. Further, it is no more required for the member store server 40 to communicate to/from the electronic money server 10 at the time of payment, and hence the time required to complete the payment is also reduced.

The user U moves into the store through the gate terminal 60, takes desired items, and heads to the store terminal 50 (Procedure 3 of FIG. 3). In the at least one embodiment, the store terminal 50 is a semi-self register, and a clerk near the store terminal 50 uses a barcode reader to read barcodes of the items. After the clerk reads the barcodes of all of the items, the clerk prompts the user U to make a payment via the store terminal 50.

The user U checks contents of a payment screen G2 displayed on the store terminal 50, and performs operation required for the payment via the store terminal 50 (Procedure 4 of FIG. 3). As illustrated in FIG. 3, on the payment screen G2, a total amount of the items, and buttons B20 and B21 for selecting a payment method are displayed. In the at least one embodiment, the user U can select any one of the electronic money or cash. The display on the payment screen G2 changes depending on the operation by the user.

Figure 4:
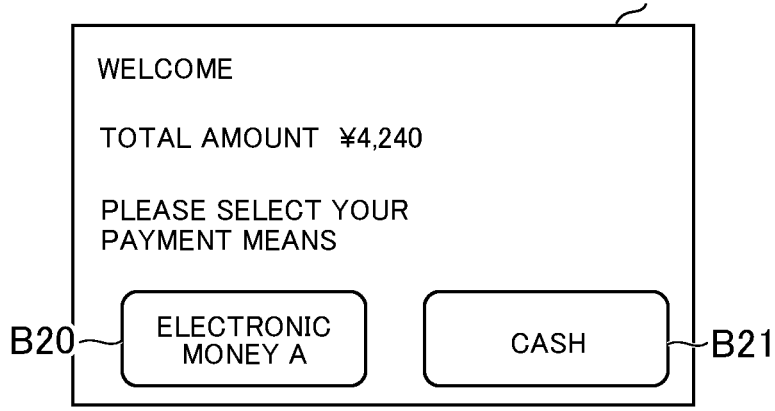
FIG. 4 is a diagram for illustrating an example of how display on a payment screen changes.
Figure 4:
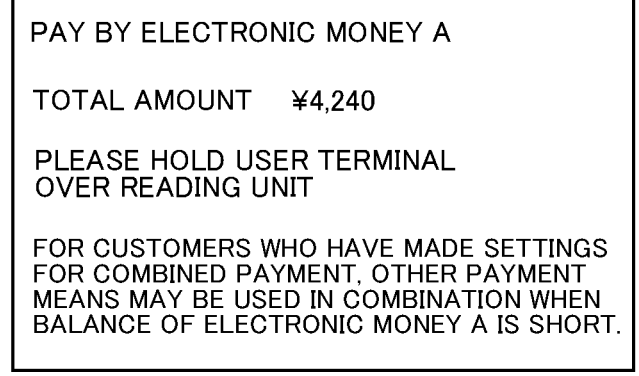
Figure 4:
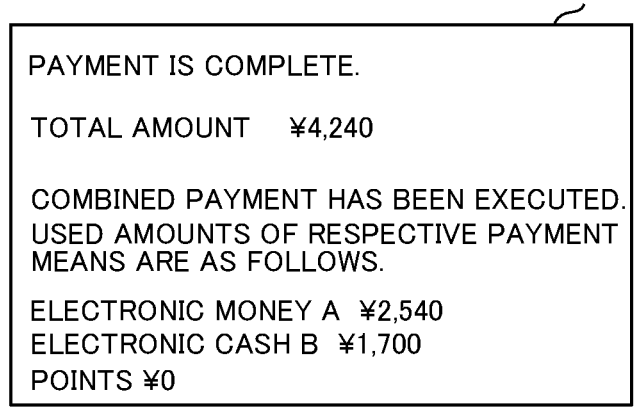

FIG. 4 is a diagram for illustrating an example of how the display on the payment screen G2 changes. As illustrated in FIG. 4, when the user U selects the button B20, a message for prompting the user U to hold the user terminal 70 over the reading unit 56 of the store terminal 50 is displayed on the payment screen G2. The user U holds the user terminal 70 over the reading unit 56 of the store terminal 50 in accordance with the message to use the electronic money. When the balance of the electronic money is the total amount or more, the payment can be made with only the electronic money. Thus, the reserved electronic cash and points are not used, and the combined payment is not executed.

In contrast, when the balance of the electronic money is less than the total amount, the combined payment is executed so as to compensate for the shortage by at least one of the electronic cash or the points. In the setting example of FIG. 2, the upper limit of the electronic cash that is 1st in order of precedence is 3,000 yen. Thus, when the shortage of the electronic money is 3,000 yen or less, only the electronic cash is used in the combined payment, and the points are not used in the combined payment. When the shortage of the electronic money is more than 3,000 yen, not only the electronic cash but also the points are used in the combined payment.

The example of FIG. 4 shows a case in which the total amount is 4,240 yen, and the balance of the electronic money is 2,540 yen. In that case, the shortage of the electronic money is 1,700 yen, and hence the electronic cash of 1,700 yen is used in the combined payment. Of the reserved electronic cash of 3,000 yen, 1,300 yen is not used in the combined payment, and hence is released for use for other purposes. The reserved points of 500 yen is not used in the combined payment, and hence is released in full. In the example of FIG. 4, the completion of the payment is informed on the screen. However, similar contents can be printed on a receipt, and the receipt may be discharged.

As described above, according to the payment system S of the at least one embodiment, when the user U holds the user terminal 70 over the reading unit 66 of the gate terminal 60, each of the electronic cash and the points are reserved. When the user U holds the user terminal 70 over the reading unit 56 of the store terminal 50, and when the balance of the electronic money is short, each of the electronic cash and the points reserved at the time of entry can be used in the combined payment. Through use of each of the electronic cash and the points that have been reserved in advance in the combined payment, the payment can be completed swiftly.

Details of the technology are described below. The reference symbol of the user U is hereinafter omitted when it is not particularly required to refer to the drawings.

3. Functions Implemented by Payment System

Figure 5:
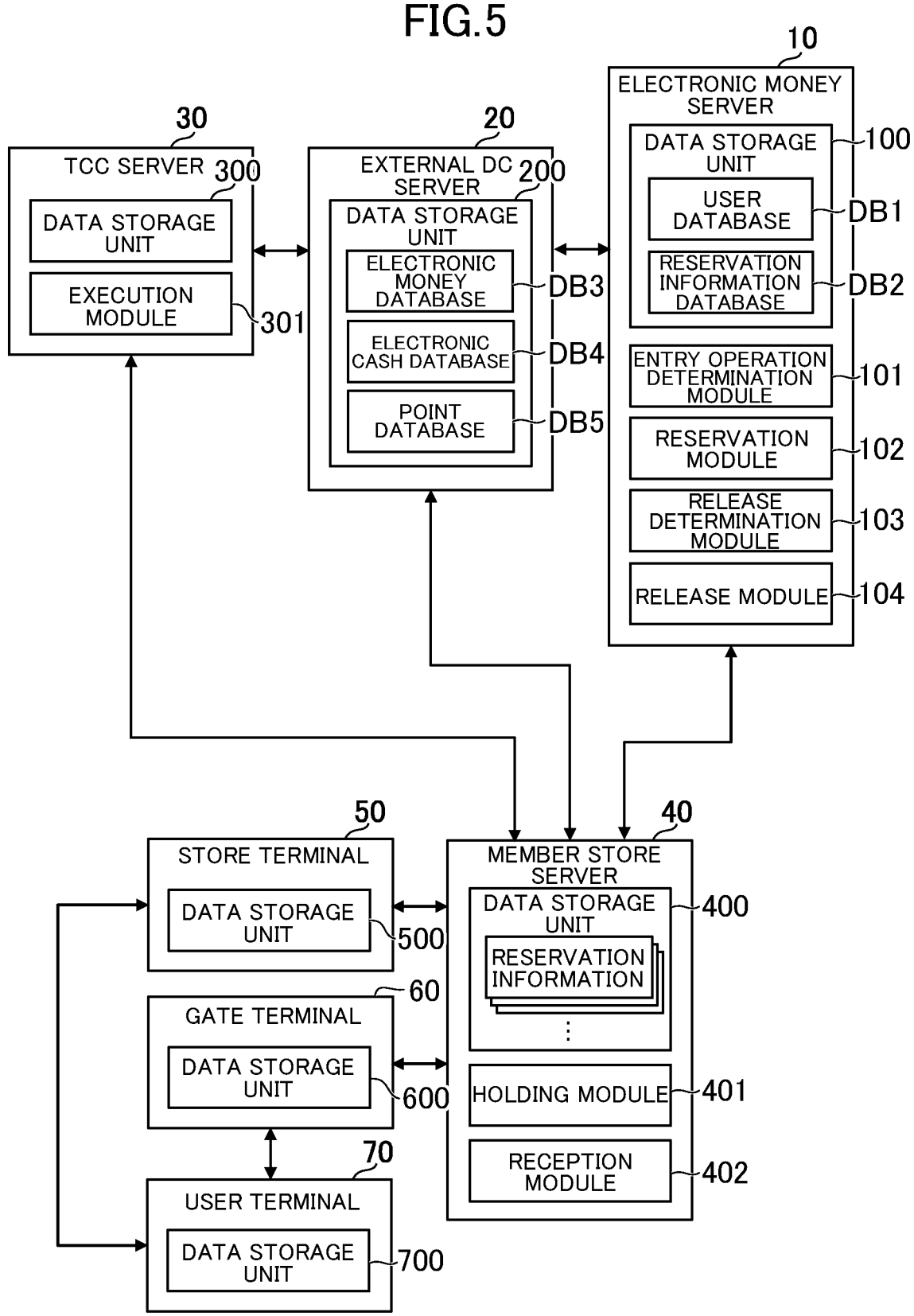
FIG. 5 is a functional block diagram for illustrating an example of functions implemented by the payment system.

FIG. 5 is a functional block diagram for illustrating an example of functions implemented by the payment system S. In the at least one embodiment, the functions implemented by each of the electronic money server 10, the external DC server 20, the TCC server 30, the member store server 40, the store terminal 50, the gate terminal 60, and the user terminal 70 are described.

[3-1. Functions Implemented on Electronic Money Server]

As illustrated in FIG. 5, on the electronic money server 10, a data storage unit 100, an entry operation determination module 101, a reservation module 102, a release determination module 103, and a release module 104 are implemented. The data storage unit 100 is implemented mainly by the storage unit 12, and each of the other functions is mainly implemented by the control unit 11.

[Data Storage Unit]

The data storage unit 100 stores data for the combined payment. For example, the data storage unit 100 stores a user database DB1 in which various kinds of information on each individual user who has made the settings for the combined payment are stored, and a reservation information database DB2 in which information on the reserved payment means is stored.

FIG. 6 is a table for showing a data storage example of the user database DB1. As shown in FIG. 6, in the user database DB1, an electronic money ID for uniquely identifying a user of an electronic money, and combination settings specified by the user via the setting screen G1 are stored. In the at least one embodiment, the order of precedence of the individual payment means used in the combined payment, information with which the payment means is identifiable, and the upper limit are stored as the combination settings.

As the information with which the payment means is identifiable, information indicating the type of the payment means, and a payment means ID with which the user of the payment means is identifiable are stored. For example, when a user has specified both the electronic cash and the points, both of an electronic cash ID and a point ID of the user are stored as the combination settings. As another example, when a user has specified only the electronic cash, an electronic cash ID of the user is stored as the combination settings.

FIG. 7 is a table for showing a data storage example of the reservation information database DB2. As shown in FIG. 7, in the reservation information database DB2, a store ID for uniquely identifying an individual store, the electronic money ID of the user who is in the store, and reservation information on the payment means reserved for the combined payment of the user are stored. In the example of FIG. 7, as the reservation information, the order of precedence, the payment means, a reserved amount, and an expiration time are stored. The reservation information of the user who has entered a store is transmitted to the member store server 40 that corresponds to the store. The expiration time is a time point at which a period in which each of the reserved electronic cash and points are effective ends. The expiration time is a time point that is a predetermined period of time after the entry time.

[Entry Operation Determination Module]

The entry operation determination module 101 determines whether an entry operation has been performed by the user. The entry operation is an operation performed at the time of entry. The entry operation is an operation that serves as a signal at the time of entry. In the at least one embodiment, holding the user terminal 70 over the reading unit 66 of the gate terminal 60 corresponds to the entry operation. The entry operation is an example of a first operation. Accordingly, the entry operation as used in the at least one embodiment, or the operation of holding the user terminal 70 over the reading unit 66 of the gate terminal 60 as used in the at least one embodiment can be read as "first operation."

The first operation is an operation that triggers the reservation by the reservation module 102. The first operation is an operation for requesting the reservation module 102 to reserve the payment means. The first operation is performed when a timing of executing the payment (timing at which the combined payment is required) approaches. The first operation is performed before a second operation which is to be described later. The first operation is an operation corresponding to preparation of the second operation which is to be described later. The first operation may be any operation, and is not limited to the example of the at least one embodiment. For example, the first operation may be an operation on the gate terminal 60 or the user terminal 70, or an operation on another computer. As another example, the first operation may not be an operation on a computer, but may be an operation like a gesture.

In the at least one embodiment, the entry operation determination module 101 determines whether the entry operation has been performed by determining whether the entry notification has been received from the member store server 40 via the TCC server 30 and the external DC server 20. When the entry notification including an electronic money ID of a user is received, the entry operation determination module 101 determines that the entry operation has been performed by the user. The entry notification may be directly transmitted from the member store server 40 to the electronic money server 10 and not via other computers, or may be directly transmitted from the gate terminal 60 to the electronic money server 10.

[Reservation Module]

Before a payment request for the electronic money is received, the reservation module 102 reserves each of the electronic cash and the points associated with the electronic money. The electronic money is an example of first payment means. Each of the electronic cash and the points are an example of second payment means. Accordingly, the electronic money as used in the at least one embodiment can be read as "first payment means." The electronic cash or the points as used in the at least one embodiment can be read as "second payment means."

The first payment means is, of a plurality of payment means that can be used by the user, payment means selected as the payment means to be used for the payment. The first payment means is main payment means in the combined payment. The first payment means is used preferentially over the second payment means in the combined payment. In the at least one embodiment, in a case in which the balance of the first payment means is short, the combined payment is executed to use the second payment means. However, even under a case in which the balance of the first payment means is not short, when the balance of the first payment means is less than a threshold value, the combined payment may be executed to use the second payment means.

The second payment means is, of the plurality of payment means that can be used by the user, another payment means that is different from the first payment means. It should be noted, however, that as described later, it is not required that the type of the second payment means and the type of the first payment means be different. Similarly, when a plurality of the second payment means are reserved, it is not required that the types of the individual second payment means be different from each other. The second payment means is subsidiary payment means in the combined payment. The second payment means is payment means to be used together with the first payment means. The second payment means is payment means which, when the payment cannot be executed with only the first payment means, is used to compensate for the shortage.

The first payment means and the second payment means being associated means that information is linked so that the second payment means can be identified from the first payment means. The second payment means specified by the user of the first payment means corresponds to the second payment means associated with the first payment means. In the at least one embodiment, in the user database DB1, the electronic money ID of the electronic money which is an example of the first payment means and the electronic cash ID or the point ID of the electronic cash or the points which are an example of the second payment means being stored in the same record corresponds to the first payment means and the second payment means being associated.

In the at least one embodiment, the case in which the reservation module 102 reserves the plurality of second payment means is described, but it is only required that the reservation module 102 reserve at least one second payment means associated with the first payment means. The number of second payment means reserved by the reservation module 102 is not limited to the example of the at least one embodiment. The reservation module 102 may reserve only one second payment means, or may reserve three or more second payment means.

In the at least one embodiment, the combination of the electronic money and each of the electronic cash and the points is given as an example, but the combination of the first payment means and the second payment means may be any combination. For example, the first payment means may be the electronic cash, and the second payment means may be the electronic money. As another example, the first payment means may be the points, and the second payment means may be a credit card. As still another example, the first payment means may be a credit card, and the second payment means may be the electronic money, for example. In addition, as long as services are interfaced with each other in some way or other, various combinations can be adopted for the combination of the first payment means and the second payment means.

The type of the second payment means is not required to be different from that of the first payment means, and may be the same as that of the first payment means. For example, it is assumed that the user possesses the user terminal 70 in which an electronic money ID of an electronic money is recorded in the IC chip 76, and a physical card in which another electronic money ID of the electronic money is recorded. In this case, the electronic money corresponding to the electronic money ID recorded in the IC chip 76 of the user terminal 70 may correspond to the first payment means, and the electronic money corresponding to the other electronic money ID recorded in the physical card may correspond to the second payment means. Two electronic moneys possessed by the user are used in the combined payment.

The payment request in the at least one embodiment is a request transmitted for making the payment using the electronic money. The payment request is transmitted when the user performs a predetermined payment operation. In the at least one embodiment, the user holding the user terminal 70 over the reading unit 56 of the store terminal 50 corresponds to the payment operation. The payment operation is an example of the second operation. Accordingly, the payment operation as used in the at least one embodiment, or the operation of holding the user terminal 70 over the reading unit 56 of the store terminal 50 as used in the at least one embodiment can be read as "second operation."

The second operation is an operation that triggers the payment by an execution module 301. The second operation is an operation for requesting the execution module 301 to execute the payment. The second operation may be any operation, and is not limited to the example of the at least one embodiment. For example, the second operation may be an operation on the gate terminal 60 or the user terminal 70, or an operation on another computer. As another example, the second operation may not be an operation on a computer, but may be an operation like a gesture.

The reservation module 102 reserves each of the electronic cash and the points at a suitable timing before the payment request for the electronic money is received. For example, when it is determined that the entry operation has been performed, the reservation module 102 reserves each of the electronic cash and the points. The reservation module 102 does not reserve each of the electronic cash and the points until it is determined that the entry operation has been performed, but reserves each of the electronic cash and the points on the condition that it is determined that the entry operation has been performed. Examples of other timings are described in modification examples which are to be described later.

The reservation module 102 reserves the electronic cash and the points so that all or a part of each of the electronic cash and the points cannot be used for purposes other than the payment by the execution module 301. The reservation corresponds to credit in credit card payment. The reservation can also be said as locking a record of each of the electronic cash and the points.

For example, storing reservation information in the reservation information database DB2 to restrict the use of the second payment means indicated by the reservation information for purposes other than the combined payment corresponds to the reservation. As another example, storing a reserved amount in each of an electronic cash database DB4 and a point database DB5 which are to be described later to put restrictions so that a balance of each of the electronic cash and the points does not fall below the reserved amount also corresponds to the reservation. For the reservation of each of the electronic cash and the points, a publicly known method can be used. It is only required that putting restrictions so that the balance of the electronic cash stored in the electronic cash database DB4 does not fall below the reserved amount, and putting restrictions so that the balance of the points stored in the point database DB5 does not fall below the reserved amount correspond to the reservation.

In the at least one embodiment, the reservation module 102 is included in the electronic money server 10, and hence before the payment request is received, the reservation module 102 transmits reservation information on each of the electronic cash and the points to the member store server 40. When a plurality of stores use the payment system S, the reservation module 102 identifies the member store server 40 based on the store ID of the store which the user has entered, and transmits the reservation information to the identified member store server 40.

In the at least one embodiment, the reservation module 102 reserves each of the electronic cash and the points based on the reserved amount of each of the electronic cash and the points that has been specified by the user of the electronic money. The reserved amount is an amount by which each of the electronic cash and the points should be reserved. In the at least one embodiment, the upper limit specified via the setting screen G1 corresponds to the reserved amount. When the balance of each of the electronic cash and the points is below the upper limit, an amount smaller than the upper limit may be reserved.

The reservation module 102 may reserve all of the balance of each of the electronic cash and the points, or may reserve a part thereof. The reserved amount is not required to be a fixed value, and may be a variable value as in modification examples to be described later. Further, when the balance of each of the electronic cash and the points is less than the upper limit specified by the user, the reservation module 102 may reserve as large an amount as reservable (that is, all of the balance).

[Release Determination Module]

The release determination module 103 determines, based on a predetermined condition, whether to release each of the electronic cash and the points that have been reserved by the reservation module 102. The release is to change from a reserved state to an unreserved state. When each of the electronic cash and the points are released, the reserved amount of each of the electronic cash and the points becomes available for use in purposes other than the combined payment. Each of the electronic cash and the points are restricted so as not to be used for purposes other than the combined payment, and hence removing the restriction corresponds to the release.

The condition for the release may be any condition. In the at least one embodiment, as examples of the condition for the release, executing the payment of the user who has entered the store, and arrival of a predetermined expiration time are described. The condition for the release may be that the user who has entered the store holds the user terminal 70 over the reading unit 66 of the gate terminal 60 at the time of exit. In other words, the condition for the release may be that the user performs a predetermined exit operation. The exit operation may be any operation as with the entry operation. As another example, starting a payment application for using each of the electronic cash and the points may be the condition for the release.

For example, the release determination module 103 determines whether the payment has been executed by the execution module 301. The release determination module 103 determines whether a completion notification indicating that the payment is complete is received from the execution module 301. When the completion notification is received, the release determination module 103 determines that the payment has been executed. As another example, the release determination module 103 determines whether the expiration time set for each of the reserved electronic cash and points has arrived.

[Release Module]

When the release determination module 103 determines that each of the electronic cash and the points are to be released, the release module 104 releases each of the electronic cash and the points that has been reserved by the reservation module 102. The release module 104 keeps reserving each of the electronic cash and the points that have been reserved by the reservation module 102 until the release determination module 103 determines that each of the electronic cash and the points are to be released, and releases each of the electronic cash and the points that have been reserved by the reservation module 102 on the condition that the release determination module 103 determines that each of the electronic cash and the points are to be released.

For example, the release module 104 releases each of the electronic cash and the points by deleting the reservation information stored in the reservation information database DB2. As another example, the release module 104 releases each of the electronic cash and the points by deleting the reserved amount stored in each of the electronic cash database DB4 and the point database DB5. As still another example, the release module 104 releases each of the electronic cash and the points by deleting the reservation information stored in a data storage unit 400 of the member store server 40.

[3-2. Functions Implemented on External DC Server]

As illustrated in FIG. 5, on the external DC server 20, a data storage unit 200 is implemented. The data storage unit 200 is implemented mainly by the storage unit 22. The data storage unit 200 stores data for the combined payment. For example, the data storage unit 200 stores an electronic money database DB3, the electronic cash database DB4, and the point database DB5. Instead of being managed by the external DC server 20, those databases may be managed by another computer, or may be managed by a plurality of computers in a distributed manner.

FIG. 8 is a table for showing a data storage example of the electronic money database DB3. As shown in FIG. 8, the electronic money database DB3 is a database in which various kinds of information on an electronic money possessed by each individual user are stored. For example, in the electronic money database DB3, the electronic money ID, the balance of the electronic money, and a usage history of the electronic money are stored. As the usage history, dates and times of use, locations of use, and used amounts of the electronic money by a user are stored. The usage history is updated every time the user uses the electronic money.

FIG. 9 is a table for showing a data storage example of the electronic cash database DB4. As shown in FIG. 9, the electronic cash database DB4 is a database in which various kinds of information on the electronic cash possessed by each individual user are stored. For example, in the electronic cash database DB4, the electronic cash ID, and the balance and a reserved amount of the electronic cash are stored. The reserved amount is the same as the reserved amount stored in the reservation information database DB2. For electronic cash that is not being reserved, the reserved amount is not stored. The balance of a record in which the reserved amount is stored is restricted so as not to fall below the reserved amount. For example, the balance of the electronic cash is regarded as an amount obtained by subtracting the reserved amount from the actual balance.

FIG. 10 is a table for showing a data storage example of the point database DB5. As shown in FIG. 10, the point database DB5 is a database in which various kinds of information on the points possessed by each individual user are stored. For example, in the point database DB5, the point ID, and the balance and a reserved amount of the points are stored. The reserved amount is the same as the reserved amount stored in the reservation information database DB2. For the points that are not being reserved, the reserved amount is not stored. The balance of a record in which the reserved amount is stored is restricted so as not to fall below the reserved amount. For example, the balance of the points is regarded as an amount obtained by subtracting the reserved amount from the actual balance.

[3-3. Functions Implemented on TCC Server]

As illustrated in FIG. 5, on the TCC server 30, a data storage unit 300 and the execution module 301 are implemented. The data storage unit 300 is mainly implemented by the storage unit 32, and the execution module 301 is mainly implemented by the control unit 31.

[Data Storage Unit]

The data storage unit 300 stores data for the combined payment. For example, the data storage unit 300 stores details (for example, the store ID, the total amount, the balance of the electronic money, and the reservation information) of individual payments indicated by payment requests received from the member store server 40.

[Execution Module]

When a payment request is received, the execution module 301 executes payment based on the electronic money and at least one of the electronic cash or the points. The payment is payment in the combined payment. The execution module 301 executes payment using in combination at least a part of the balance of the electronic money, and at least a part of the balance of at least one of the electronic cash or the points that have been reserved by the reservation module 102. In the payment, both of the balance of the electronic money, and the balance of at least one of the electronic cash or the points are reduced.

For example, the execution module 301 determines whether the balance of the electronic money becomes short based on the payment request. When it is not determined that the balance of the electronic money becomes short, the execution module 301 executes the payment based on the electronic money, and does not use each of the electronic cash and the points. When it is determined that the balance of the electronic money becomes short, the execution module 301 executes the payment based on the electronic money and at least one of the electronic cash or the points.

In the at least one embodiment, after charging the electronic money once based on at least one of the electronic cash or the points, the execution module 301 executes the payment based on the charged electronic money. For example, the execution module 301 increases the balance of the electronic money by the reserved amount of at least one of the electronic cash or the points, and executes the payment based on the electronic money increased by the balance. In this case, a flow of the payment after the charging per se is the same as a normal flow that is not the combined payment. Instead of charging the electronic money once, the execution module 301 may execute the payment in the combined payment by reducing each of the balance of the electronic money, and the balance of at least one of the electronic cash or the points.

In the at least one embodiment, when the payment request is received, the execution module 301 executes the payment based on the reservation information held by a holding module 401 without requesting the reservation information from the reservation module 102. When the payment request is received, the execution module 301 executes the payment based on the reservation information held by the holding module 401 without communicating to/from the electronic money server 10. The reservation information is acquired from the member store server 40, and hence it is not required to acquire the reservation information from the reservation information database DB2 of the electronic money server 10.

In the at least one embodiment, the user specifies the electronic cash and the points as the plurality of second payment means, and hence the execution module 301 executes the payment based on the order of precedence set for each of the electronic cash and the points. The execution module 301 executes the payment so that, of the electronic cash and the points, payment means that is higher in order of precedence is used preferentially in decreasing order of precedence. For example, the execution module 301 executes the payment so that the used amount of payment means that is relatively higher in order of precedence is larger than the used amount of payment means that is relatively lower in order of precedence.

[3-4. Functions Implemented on Member Store Server]

As illustrated in FIG. 5, on the member store server 40, the data storage unit 400, the holding module 401, and a reception module 402 are implemented. The data storage unit 400 is mainly implemented by the storage unit 42, and each of the other functions is mainly implemented by the control unit 41.

[Data Storage Unit]

The data storage unit 400 stores data for the combined payment. For example, the data storage unit 400 stores, of the reservation information stored in the reservation information database DB2, reservation information of the store corresponding to the member store server 40.

[Holding Module]

The holding module 401 acquires and holds reservation information on each of the electronic cash and the points from the reservation module 102 before the payment request is received. Holding means recording the reservation information in the data storage unit 400 without deleting the reservation information. The holding module 401 holds the reservation information in the data storage unit 400 at least until the payment request is received. The reservation information held by the holding module 401 is released when the reservation information is released by the release module 104. In other words, when the reservation information in the electronic money server 10 is released, the reservation information in the member store server 40 is also released.

[Reception Module]

The reception module 402 receives the payment request. In the at least one embodiment, the reception module 402 receives the payment request when, after a predetermined entry operation is performed by the user of the electronic money, a predetermined payment operation is performed by the user. The user performs the payment operation by holding the user terminal 70 over the reading unit 56 of the store terminal 50, and hence the reception module 402 receives the payment request from the store terminal 50.

[3-5. Functions Implemented on Store Terminal]

As illustrated in FIG. 5, on the store terminal 50, a data storage unit 500 is implemented. The data storage unit 500 is implemented mainly by the storage unit 52. The data storage unit 500 stores data for the combined payment. For example, the data storage unit 500 stores the store ID of the store in which the store terminal 50 is arranged, and details (such as total amount, barcode information of items, and unit prices of the items) of the payment.

[3-6. Functions Implemented on Gate Terminal]

As illustrated in FIG. 5, on the gate terminal 60, a data storage unit 600 is implemented. The data storage unit 600 is implemented mainly by the storage unit 62. The data storage unit 600 stores data for the combined payment. For example, the data storage unit 600 stores the store ID of the store in which the gate terminal 60 is arranged.

[3-7. Functions Implemented on User Terminal]

As illustrated in FIG. 5, on the user terminal 70, a data storage unit 700 is implemented. The data storage unit 700 is implemented mainly by the storage unit 72. The data storage unit 700 stores data for the combined payment. For example, the data storage unit 700 stores the electronic money ID. The data storage unit 700 also stores the balance and key information of the electronic money, for example. The data storage unit 700 may further store information on each of the electronic cash and the points (electronic cash ID, point ID, and balance thereof), for example.

4. Processing to be Executed by Payment System

Figure 11:
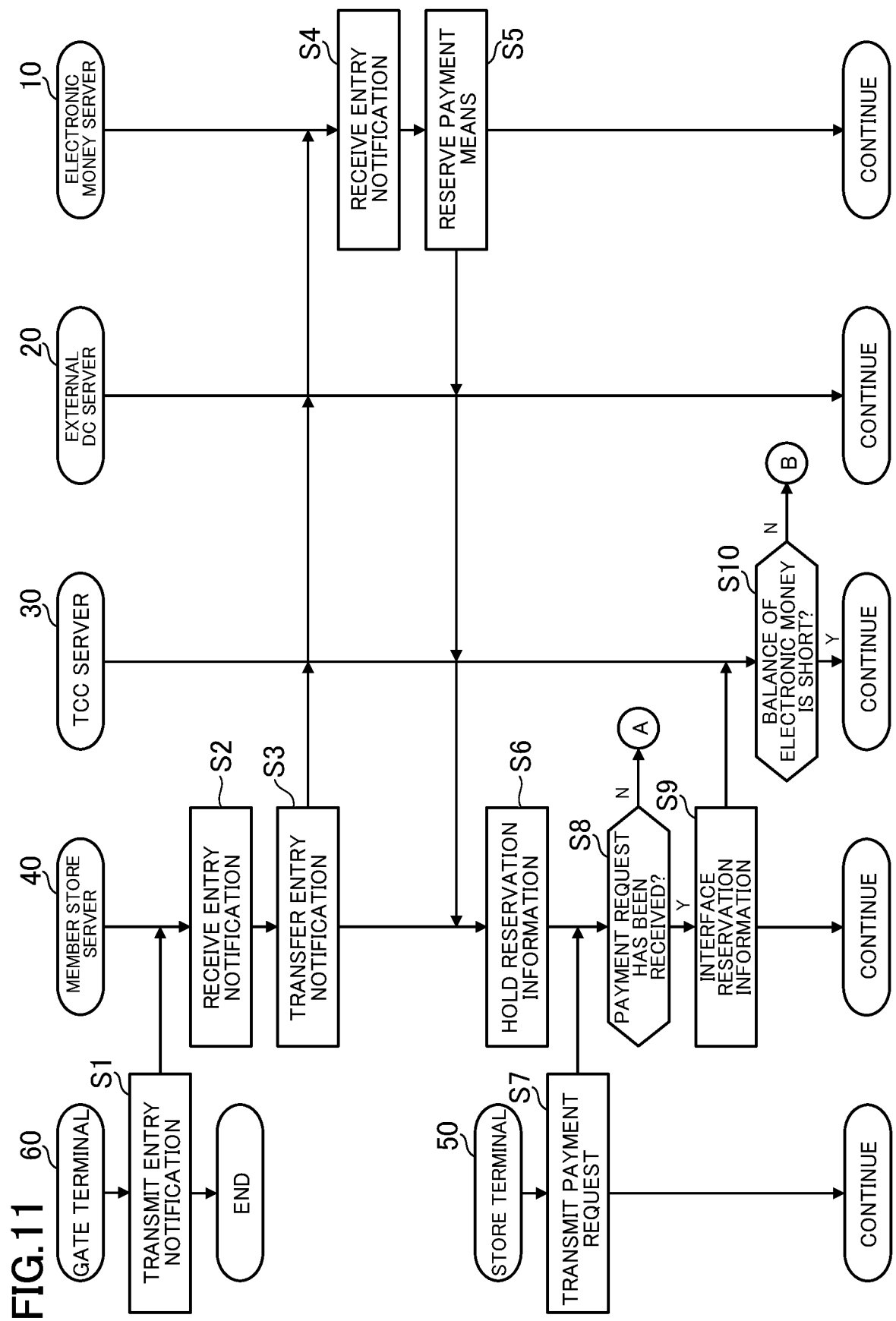
FIG. 11 is a flow chart for illustrating an example of processing to be executed by the payment system.
Figure 12:
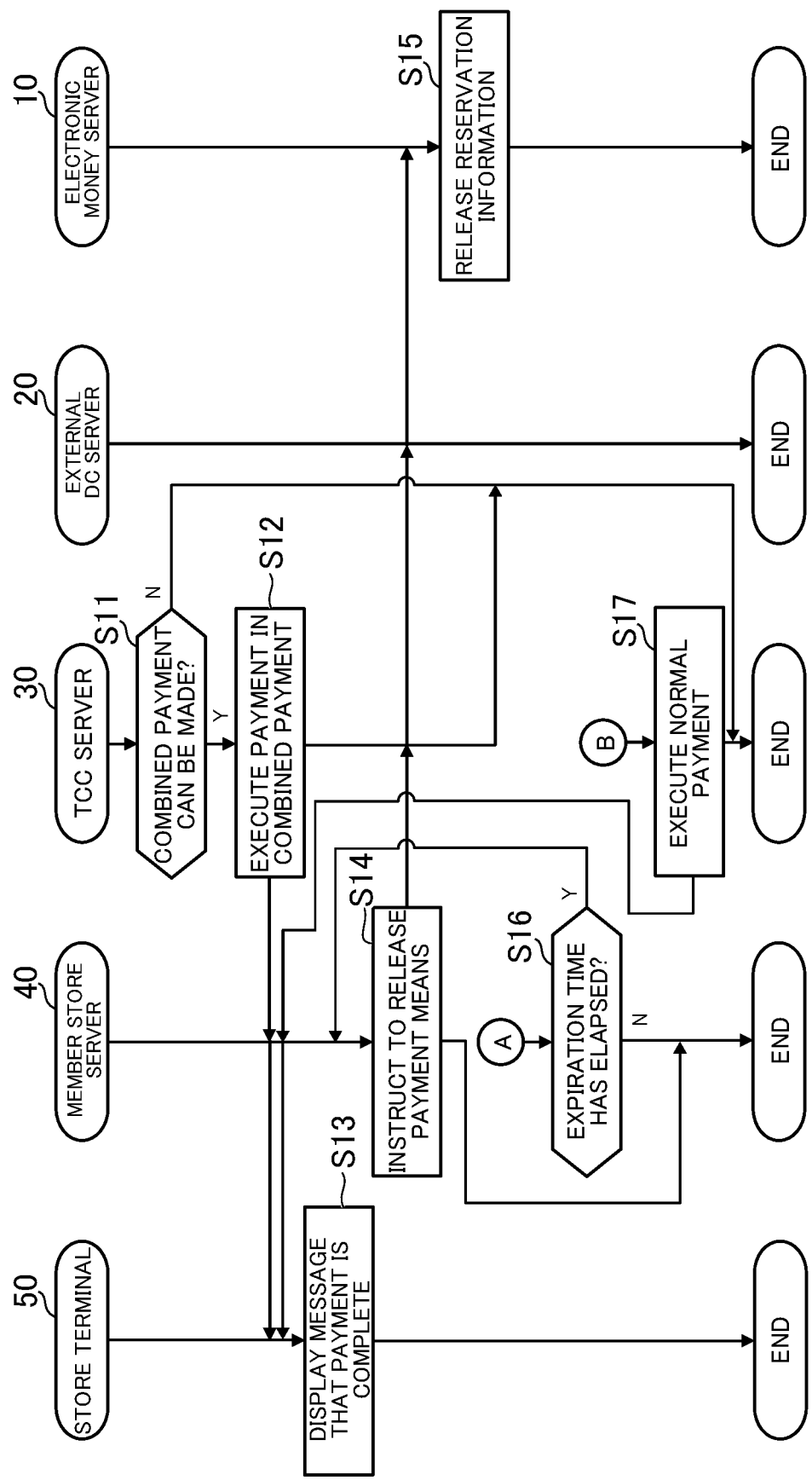
FIG. 12 is a flow chart for illustrating the example of the processing to be executed by the payment system.

FIG. 11 and FIG. 12 are flow charts for illustrating an example of processing to be executed by the payment system S. The processing illustrated in FIG. 11 and FIG. 12 is executed by the control units 11, 21, 31, 41, 51, 61, and 71 operating in accordance with the programs stored in the storage units 12, 22, 32, 42, 52, 62, and 72, respectively. The processing illustrated in FIG. 11 and FIG. 12 is an example of processing to be executed by the functional blocks illustrated in FIG. 5. When the processing of FIG. 11 and FIG. 12 is executed, the user has already specified the combination settings via the setting screen G1.

As illustrated in FIG. 11, when the user holds the user terminal 70 over the reading unit 66 of the gate terminal 60, the gate terminal 60 transmits, to the member store server 40, the entry notification indicating that the user has entered the store (Step S1), and the member store server 40 receives the entry notification from the gate terminal 60 (Step S2). In Step S1, the reading unit 66 acquires the electronic money ID from the IC chip 76 of the user terminal 70. The gate terminal 60 transmits, to the member store server 40, the entry notification including the store ID of the store in which the gate terminal 60 is arranged, and the electronic money ID acquired from the IC chip 76.

The user may hold, instead of the IC chip 76 of the user terminal 70, a physical card (for example, IC card or magnetic card) in which an electronic money ID and other information are recorded over, or insert the physical card into, the reading unit 66 of the gate terminal 60. In this case, in Step S1, the reading unit 66 acquires the electronic money ID recorded in the physical card. The gate terminal 60 transmits, to the member store server 40, the entry notification including the store ID of the store in which the gate terminal 60 is arranged, and the electronic money ID acquired from the physical card.

The member store server 40 transfers, to the electronic money server 10 via the TCC server 30 and the external DC server 20, the entry notification received in Step S1 (Step S3). When the electronic money server 10 receives the entry notification from the member store server 40 and determines that the entry operation has been performed (Step S4), the electronic money server 10 reserves, based on the user database DB1, payment means of the user so that the user who has entered the store can use the combined payment (Step S5).

In Step S5, the electronic money server 10 refers to the user database DB1 to acquire the combination settings associated with the electronic money ID received in Step S3. The electronic money server 10 updates the reservation information database DB2 so as to reserve, based on the combination settings, the payment means specified by the user by the upper limit specified by the user. The electronic money server 10 requests the external DC server 20 to interface the reserved payment means. The external DC server 20 updates at least one of the electronic cash database DB4 or the point database DB5 so that the payment means specified by the user who has entered the store is reserved by the upper limit.

The member store server 40 receives and holds the reservation information from the electronic money server 10 (Step S6). The member store server 40 may receive the reservation information via each of the external DC server 20 and the TCC server 30, or may receive the reservation information not particularly via the external DC server 20 and the TCC server 30. After that, the user moves around the store to take items, and heads toward the store terminal 50. A clerk near the store terminal 50 reads the barcodes of all items taken by the user. The user performs operation for the payment on the store terminal 50.

When the user holds the user terminal 70 over the reading unit 56 of the store terminal 50, the store terminal 50 transmits the payment request for the electronic money to the member store server 40 (Step S7). In Step S7, the reading unit 56 acquires, from the IC chip 76 of the user terminal 70, the electronic money ID and the balance of the electronic money. The store terminal 50 transmits, to the member store server 40, the payment request including the store ID and the total amount, and the electronic money ID and the balance of the electronic money which have been acquired from the IC chip 76.

In Step S7, as in Step S1, the user may hold, instead of the IC chip 76 of the user terminal 70, a physical card (for example, IC card or magnetic card) in which an electronic money ID and other information are recorded over, or insert the physical card into, the reading unit 56 of the store terminal 50. In this case, in Step S7, the reading unit 56 acquires the electronic money ID recorded in the physical card. The store terminal 50 transmits, to the member store server 40, the payment request including the store ID, and the electronic money ID acquired from the physical card.

The member store server 40 determines whether the payment request has been received from the store terminal 50 (Step S8). When it is determined that the payment request has been received (Step S8: Y), the member store server 40 interfaces, based on the payment request received in Step S8, the reservation information with the TCC server 30 (Step S9). In Step S9, the member store server 40 identifies, from among the pieces of reservation information stored in the storage unit 42, a piece of reservation information including the electronic money ID included in the payment request. The member store server 40 transmits, along with the payment request received in Step S8, the identified piece of reservation information to the TCC server 30.

After interfacing the reservation information with the member store server 40, the TCC server 30 determines whether the balance of the electronic money becomes short (Step S10). In Step S10, the TCC server 30 acquires the balance of the electronic money and the total amount which are included in the payment request received from the member store server 40, and determines whether the balance of the electronic money is the total amount or more. The balance of the electronic money is not required to be included in the payment request. In this case, the TCC server 30 may inquire the balance of the electronic money from the external DC server 20.

When it is determined that the balance of the electronic money becomes short (Step S10: Y), the process advances to FIG. 12, and the TCC server 30 determines, based on the reservation information interfaced from the member store server 40, whether the combined payment by the user can be made (Step S11). In Step S11, the TCC server 30 sums up the balance of the electronic money included in the payment request, and the reserved amounts of the electronic cash and the points included in the reservation information, and compares the sum with the total amount included in the payment request. When the sum of the balance and the reserved amounts is the total amount included in the payment request or more, it is determined that the combined payment can be made.

When it is determined that the combined payment can be made (Step S11: Y), the TCC server 30 executes the payment by the combined payment (Step S12), and the store terminal 50 displays a message that the payment is complete (Step S13). In Step S12, the TCC server 30 instructs the member store server 40 or the store terminal 50 to charge the electronic money. When the instruction to charge the electronic money is received, the member store server 40 or the store terminal 50 charges the electronic money, and then subtracts the total amount from the charged electronic money.

The member store server 40 instructs the electronic money server 10 via the TCC server 30 and the external DC server 20 to release at least one of the reserved electronic cash or the reserved points (Step S14). The electronic money server 10 releases at least one of the reserved electronic cash or the reserved points (Step S15), and this process ends.

When it is not determined in Step S8 that the payment request has been received (Step S8: N), the member store server 40 determines whether the expiration time for the reservation information has elapsed (Step S16). When it is determined that the expiration time has elapsed (Step S16: Y), the process advances to Step S14, and the reservation information for which the expiration time has elapsed is released. When it is not determined in Step S10 that the balance of the electronic money becomes short (Step S10: N), the TCC server 30 executes normal payment without making the combined payment (Step S17), and the process advances to Step S13. In this case, the combined payment is not made, and hence each of the reserved electronic cash or the reserved points are not used. When it is not determined in Step S11 that the combined payment can be made (Step S11: N), this process ends. In this case, on the store terminal 50, an error message is displayed. With the balance of the electronic money being short, the user operates the store terminal 50 to charge the electronic money, or uses another payment method.

According to the payment system S of the at least one embodiment, before the payment request for the electronic money is received, each of the electronic cash and the points which are associated with the electronic money are reserved to reduce processing to be executed after the payment request is received, and the payment in the combined payment can be completed swiftly. For example, when the balance of each of the electronic cash and the points is referred to after the payment request is received, processing to be executed from when the payment request is received to when the payment is complete is increased, and hence the payment takes time. To address this problem, each of the electronic cash and the points are reserved in advance to reduce the processing, and the payment in the combined payment can be completed swiftly. With this configuration, it is possible to prevent a situation in which the user who has held the user terminal 70 over the reading unit 56 of the store terminal 50 moves the user terminal 70 away with the payment not being complete after several seconds, and the payment becomes incomplete. Further, in the case in which the balance of the first payment means is short, when the payment is executed after having a charging operation performed by the user or the clerk, it takes time and dwell time at the store terminal 50 becomes longer. However, with the payment being completed swiftly by the combined payment, turnover at the store and efficiency in store operation are increased. Further, with the payment system S releasing the electronic cash and the points when it is determined that the payment has been executed, or when the expiration time has arrived, it is possible to prevent unnecessary electronic cash and points from being reserved indefinitely. As a result, it becomes possible to use the reserved electronic cash and points for purposes other than the combined payment, and convenience of the user is increased. Further, even when the electronic money does not support an auto charging function, for example, the payment in the case in which the electronic money is short can be made.

Further, the member store server 40 holds, before the payment request is received, the reservation information received from the electronic money server 10, and executes, when the payment request is received, the payment based on the held reservation information. As a result, it is no more required to communicate to/from the electronic money server 10 after the payment request is received, and the payment can be completed more swiftly. For example, even when a communication failure occurs between the electronic money server 10 and the member store server 40, the payment in the combined payment can be executed with the reservation information held in the member store server 40. Further, for example, even when a failure occurs in the electronic money server 10, the payment in the combined payment can be executed with the reservation information held in the member store server 40. As a result, a probability of completing the payment in the combined payment can be increased.

Still further, when it is determined that the entry operation has been performed, the payment system S reserves each of the electronic cash and the points so that, when a timing at which the user is likely to use the combined payment approaches, the electronic cash and the points can be reserved. As a result, the payment in the combined payment can be completed swiftly.

Yet further, with the payment system S reserving each of the electronic cash and the points based on the reserved amount of each of the electronic cash and the points that has been specified by the user of the electronic money, each of the electronic cash and the points can be reserved by an amount considered to be required by the user, and convenience of the user is increased.

Yet further, with the payment system S executing the payment based on the order of precedence set for each of the electronic cash and the points, it is possible to achieve the combined payment in which the electronic cash and the points are used in order of preferential use by the user.

5. Modification Examples

The present disclosure is not limited to the at least one embodiment described above, and can be modified suitably without departing from the spirit of the present disclosure.

Figure 13:
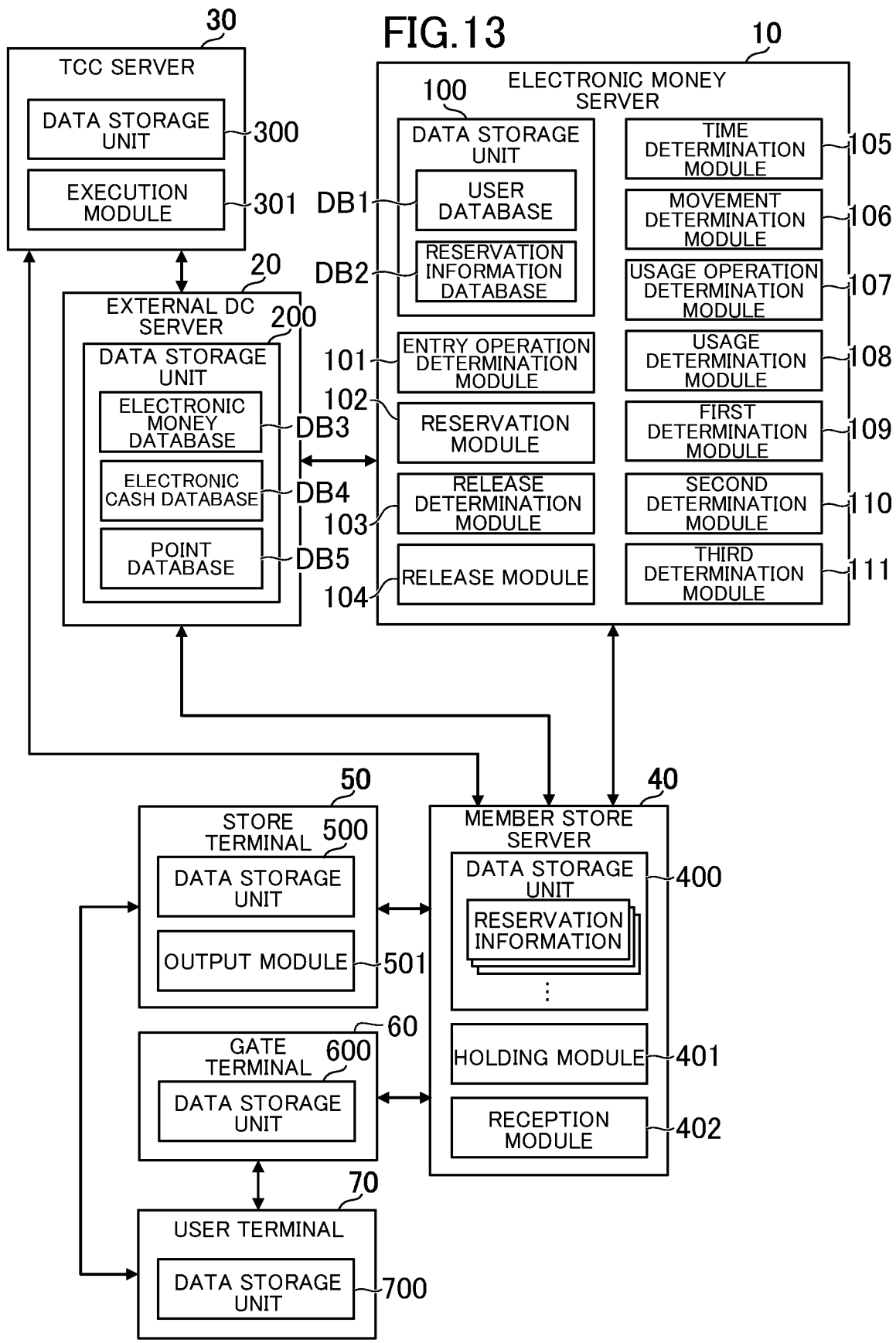
FIG. 13 is a functional block diagram in modification examples of the present disclosure.

FIG. 13 is a functional block diagram in modification examples of the present disclosure. As illustrated in FIG. 13, in the modification examples described below, in the electronic money server 10, a time determination module 105, a movement determination module 106, a usage operation determination module 107, a usage determination module 108, a first determination module 109, a second determination module 110, and a third determination module 111 are implemented. Those functions are each implemented mainly by the control unit 11. Further, in the store terminal 50, an output module 501 is implemented. The output module 501 is implemented mainly by the control unit 51.

(1) For example, the timing at which each of the electronic cash and the points are reserved is not limited to the example in the at least one embodiment. It is only required that, when the timing at which the user is likely to use the electronic money approaches, each of the electronic cash and the points be reserved. The user may forget to hold the user terminal 70 over the reading unit 66 of the gate terminal 60, and there are stores in which the gate terminal 60 cannot be installed in the first place. To address those problems, in Modification Example (1), description is given of a case in which the timing at which the user is likely to use the electronic money is predicted from the usage history of the user in the past.

The payment system S according to Modification Example (1) includes the time determination module 105. The time determination module 105 determines, based on the usage history of the user of the electronic money, whether a reservation time of each of the electronic cash and the points has arrived. The usage history is a history of how the electronic money has been used. The usage history shows at least one of the date and time of use, the used amount, or the location of use at or by which the user used the electronic money. Description is given of a case in which the usage history is stored in the electronic money database DB3 of FIG. 8. However, the usage history may be stored in another database, or may be stored in a computer other than the electronic money server 10.

The reservation time is a time at which each of the electronic cash and the points are to be reserved. The time means not only a pinpoint time point, but also a time period (period) having a certain length. The reservation time is a predicted time of use at which the user is predicted to use the electronic money, or a time that is a predetermined period of time before the predicted time of use. The predicted time of use is predicted based on the usage history of the user.

Figure 14:
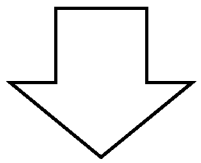
FIG. 14 is a diagram for illustrating an example of a relationship between a predicted time of use of an electronic money and a reservation time of electronic cash and points.
Figure 14:
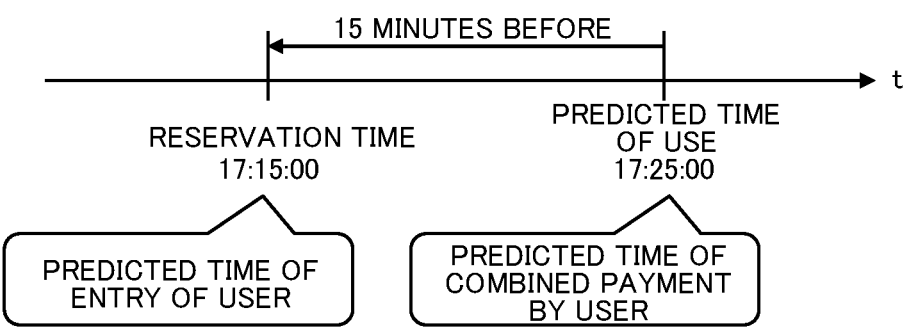

FIG. 14 is a diagram for illustrating an example of a relationship between the predicted time of use of the electronic money and the reservation time of the electronic cash and the points. As illustrated in FIG. 14, the time determination module 105 calculates, as the predicted time of use of the user, an average value of the dates and times of use included in the usage history of the user. The time determination module 105 may set the predicted time of use directly as the reservation time, but in the example of FIG. 14, sets the time that is the predetermined period of time before the predicted time of use as the reservation time.

For example, when it is assumed that the predicted time of use depending on the usage history of the user is "17:25:00," the reservation time is "17:10:00" which is the predetermined period of time (for example, 15 minutes) before that. The predetermined period of time may be a fixed value, or may be a variable value. When the predetermined period of time is a variable value, the predetermined period of time may be determined based on a tendency depending on the day of the week, the time period, the store, or the age of the user, for example. The length of the predetermined period of time may be any length, but may be several minutes to several tens of minutes because when the length is too long, the electronic cash and the like cannot be used for other purposes.

The dates and times of use considered in the calculation of the predicted time of use may be the entire period, or may be a latest partial period. The predicted time of use may be calculated for weekdays or holidays, or may be calculated for each day of the week. The predicted time of use may be calculated so that, as the date and time of use included in the usage history becomes newer, weighting becomes heavier. As another example, the predicted time of use may be predicted not by a formula but by a machine learning model.

The time determination module 105 acquires a current time with use of a real-time clock, for example, to determine whether the reservation time has arrived based on the current time. When the reservation time is a pinpoint time point, the time determination module 105 determines whether the reservation time and the current time match. A match therebetween corresponds to the arrival of the reservation time. When the reservation time is a time period, the time determination module 105 determines whether a start time point of the time period and the current time match. A match therebetween corresponds to the arrival of the reservation time. When the reservation time is a time period, instead of using the start time point as a reference, a suitable time point included in the time period may be used as the reference.

When it is determined that the reservation time has arrived, the reservation module 102 reserves each of the electronic cash and the points. The reservation module 102 does not reserve each of the electronic cash and the points until it is determined that the reservation time has arrived, and reserves each of the electronic cash and the points on the condition that it is determined that the reservation time has arrived. The release module 104 may release each of the reserved electronic cash and the reserved points when the predicted time of use has elapsed, or when a certain time has elapsed since the reservation time. In this case, each of the reserved electronic cash and the reserved points are released assuming that the user has not visited the store, or the user has visited the store but has not bought anything.

According to Modification Example (1), with the electronic cash and the points being reserved when it is determined that the reservation time predicted based on the usage history of the user of the electronic money has arrived, the electronic cash and the points can be reserved when the timing at which the user is likely to use the combined payment approaches. As a result, the payment in the combined payment can be completed swiftly. Further, it is no more required to prompt the user to perform the entry operation, and hence convenience of the user is increased. Still further, it is no more required to install the gate terminal 60 in the store, and hence convenience of the store is also increased.

(2) Further, for example, the timing at which the user is likely to use the electronic money may be predicted with use of a current position of the user. The current position of the user can be acquired by any method, and the current position is acquired with use of a base station or an access point to/from which the communication unit 73 communicates, or signals received by the GPS reception unit 77, for example. In the data storage unit 100 in Modification Example (2), location information of the store at which the electronic money can be used is stored. The location information is expressed by an address, a latitude and longitude, or coordinates of the store.

The payment system S according to Modification Example (2) includes the movement determination module 106. The movement determination module 106 determines, based on the current position of the user of the electronic money, whether the user has moved to a store at which the electronic money can be used. The store is an example of a location at which the electronic money can be used. Accordingly, the store as used herein can be read as "location at which the electronic money can be used." The location may be any location without limiting to the store. For example, the location may be any location at which the electronic money can be used, for example, a hotel, a public facility, an event venue, a stadium, or an office.

Figure 15:
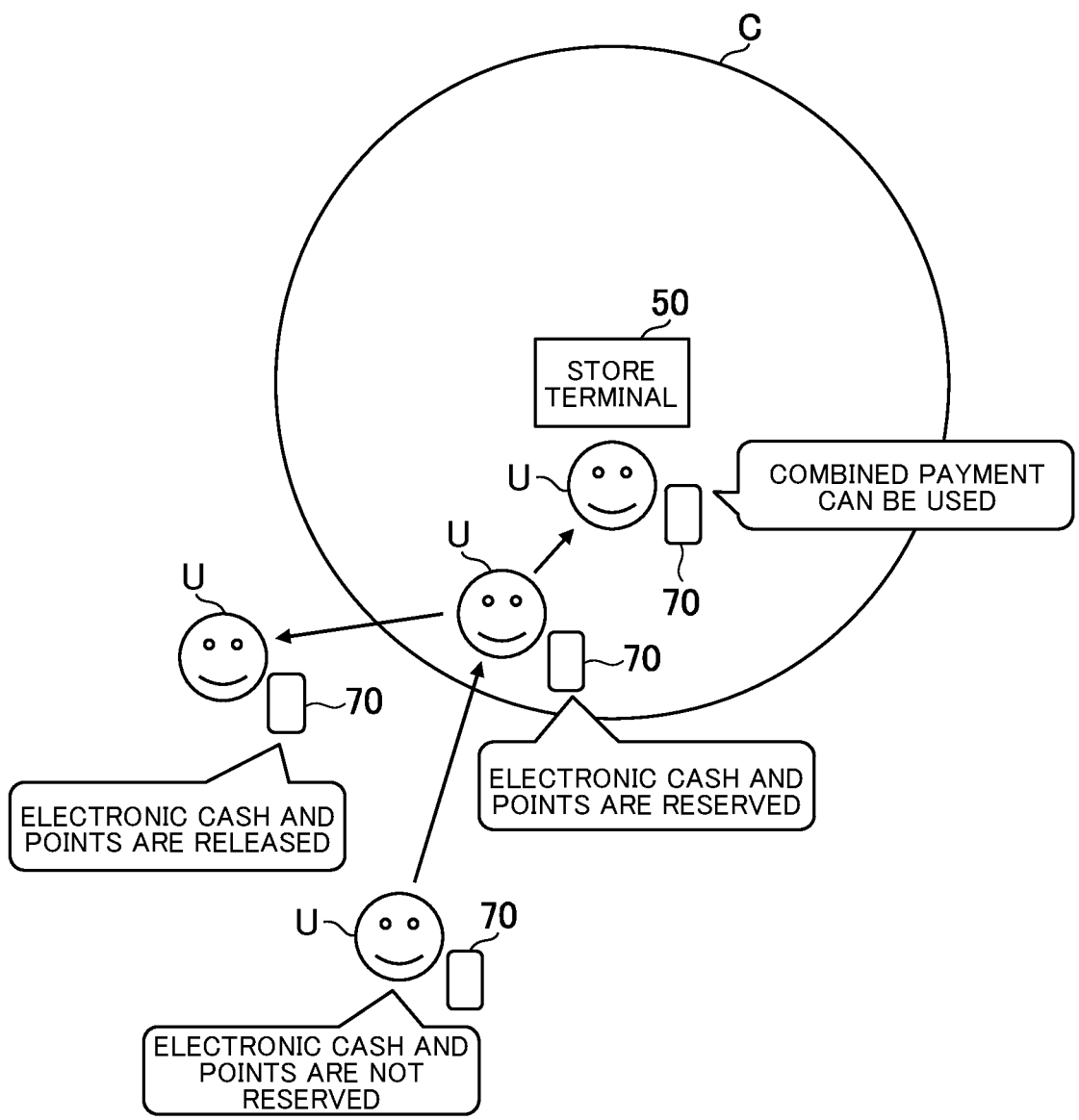
FIG. 15 is a diagram for illustrating an example of a relationship between a current position of the user and a store at which an electronic money can be used.

FIG. 15 is a diagram for illustrating an example of a relationship between the current position of the user and the store at which the electronic money can be used. The movement determination module 106 calculates a distance between the current position of the user U and a position of the individual store at which the electronic money can be used. When the distance becomes less than a threshold value, the movement determination module 106 determines that the user U has moved to the store at which the electronic money can be used. In FIG. 15, a range of the threshold value is shown by a circle C. The threshold value may be a fixed value, or may be a variable value. When the threshold value is a variable value, the threshold value may be determined depending on an area in which the store is located, for example.

When it is determined that the user U has moved to the store at which the electronic money can be used, the reservation module 102 reserves each of the electronic cash and the points. The reservation module 102 does not reserve each of the electronic cash and the points until it is determined that the user U has moved to the store at which the electronic money can be used, and reserves each of the electronic cash and the points on the condition that it is determined that the user U has moved to the store at which the electronic money can be used.

As illustrated in FIG. 15, when the user U leaves the store at which the electronic money can be used, the release module 104 may release each of the reserved electronic cash and the reserved points. The leaving means that the distance between the current position of the user U and the store at which the electronic money can be used changes from a state of being less than the threshold value to a state of being the threshold value or more. In this case, assuming that the user U has exited the store, each of the reserved electronic cash and the reserved points are released.

According to Modification Example (2), with each of the electronic cash and the points being reserved when it is determined, based on the current position of the user of the electronic money, that the user has moved to the store, each of the electronic cash and the points can be reserved when the timing at which the user is likely to use the combined payment approaches. As a result, the payment in the combined payment can be completed swiftly. Further, it is no more required to prompt the user to perform the entry operation, and hence convenience of the user is increased. Still further, it is no more required to install the gate terminal 60 in the store, and hence convenience of the store is also increased.

(3) Further, for example, after each of the electronic cash and the points are reserved, the user may use any one of the electronic cash and the points. For example, when the store is crowded, and the user is in line for the store terminal 50, the user may operate the user terminal 70 to use online shopping. In this case, when each of the electronic cash and the points are kept reserved, the electronic cash and the points cannot be used in the online shopping. Thus, when it is likely that, after each of the electronic cash and the points are reserved for the combined payment, the user will use each of the electronic cash and the points for other purposes, each of the electronic cash and the points may be released.

The payment system S according to Modification Example (3) includes the usage operation determination module 107. The usage operation determination module 107 determines, after each of the electronic cash and the points are reserved, whether a predetermined usage operation for using each of the electronic cash and the points has been performed by the user of the electronic money. The usage operation is an example of a third operation. Accordingly, the usage operation as used in Modification Example (3) can be read as "third operation." The usage operation is operation for using each of the electronic cash and the points for purposes other than the combined payment. In Modification Example (3), description is given of the case in which the usage operation is operation on the user terminal 70, but the usage operation may be operation on another computer.

Figure 16:
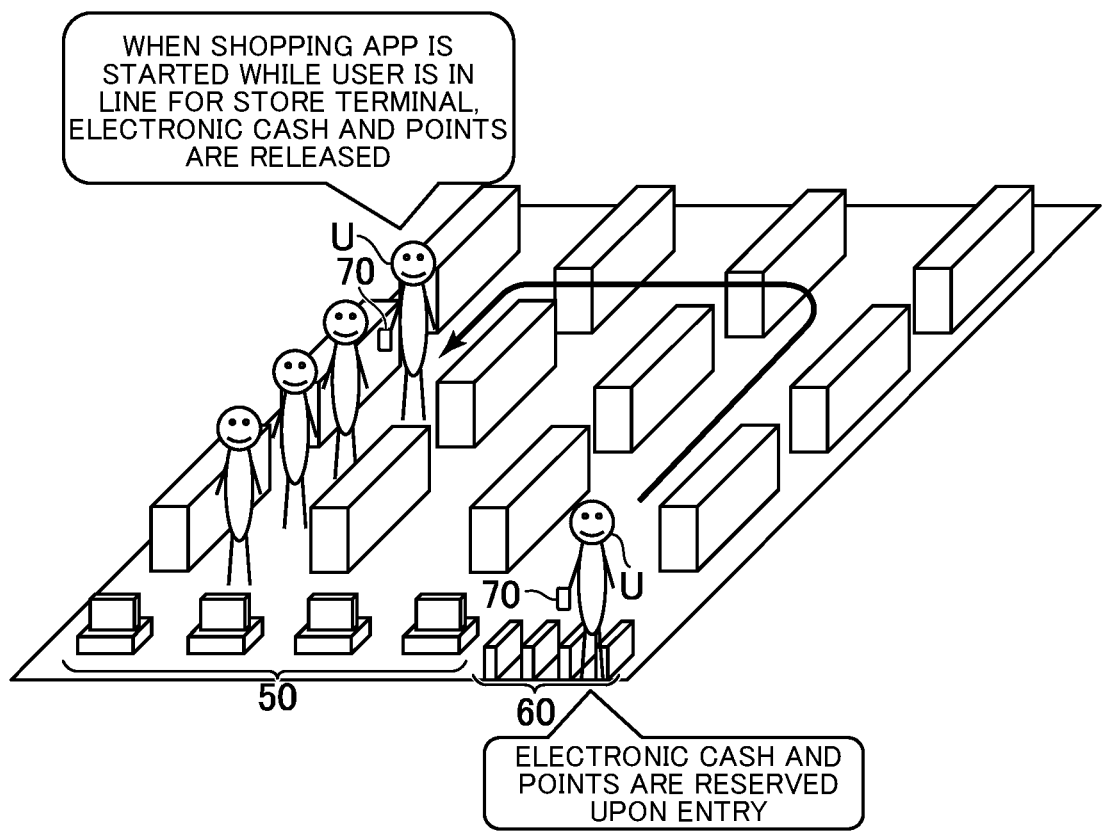
FIG. 16 is a diagram for illustrating an example of how the user performs a usage operation after the electronic cash and points are reserved.

FIG. 16 is a diagram for illustrating an example of how the user performs the usage operation after the electronic cash and the points are reserved. As illustrated in FIG. 16, when the user enters a store, each of the electronic cash and the points are reserved as in the at least one embodiment. After that, when the user moves around the store and is in line for the store terminal 50, the user operates the user terminal 70 to start an application (hereinafter referred to as "shopping app") for the online shopping. The operation of starting the shopping app is an example of the usage operation. The usage operation is not limited to the operation of starting the shopping app, but may be, for example, operation of putting an item in a shopping cart of the shopping app, or operation of selecting a payment button of the shopping app.

When the shopping app is started, a predetermined notification is transmitted from the user terminal 70 to the electronic money server 10. The notification includes the electronic money ID and other information so that it is possible to determine which user has started the shopping app. By receiving the notification, the electronic money server 10 can detect that the usage operation has been performed. When it is determined that the usage operation has been performed, the release module 104 releases each of the electronic cash and the points. In the example of FIG. 16, in the case in which the user has started the shopping app, it is possible that the user may use each of the electronic cash and the points before making the combined payment at the store terminal 50 (while in line for the store terminal 50), and hence the release module 104 releases each of the reserved electronic cash and the reserved points.

According to Modification Example (3), with each of the electronic cash and the points being released when it is determined that the usage operation has been performed by the user of the electronic money after each of the electronic cash and the points are reserved, it is possible to prevent a situation in which each of the electronic cash and the points cannot be used for purposes other than the combined payment, and convenience of the user is increased.

(4) Further, for example, in the example of FIG. 16, when the user terminal 70 is switched to a sleep mode, when the shopping app is moved to the background, or when the shopping app is ended after the user has started the shopping app, and while the user is in line for the store terminal 50, it is highly likely that the user will not use each of the electronic cash and the points, and hence the electronic cash and the points may be reserved again for the combined payment. In addition, for example, when the user has completed shopping in the shopping app, it is highly likely that the user will not use each of the electronic cash and the points for a while after that, and hence the electronic cash and the points may be reserved again for the combined payment.

The payment system S according to Modification Example (4) includes the usage determination module 108. After it is determined that the usage operation has been performed, the usage determination module 108 determines the use of each of the electronic cash and the points. Determining the use as used herein means determining whether each of the electronic cash and the points have been used, or determining whether each of the electronic cash and the points have not been used.

The usage determination module 108 determines the use of each of the electronic cash and the points based on a predetermined condition. That condition may be a condition under which it can be assumed that each of the electronic cash and the points will not be used although the usage operation has been performed. For example, performing a predetermined operation on the user terminal 70, the user terminal 70 entering a predetermined state, or a certain time having elapsed since the usage operation was performed may correspond to the condition. As another example, the user completing the shopping in the shopping app may correspond to the condition.

The reservation module 102 reserves each of the electronic cash and the points again based on a result of the determination by the usage determination module 108. For example, the reservation module 102 reserves each of the electronic cash and the points again when it is determined that the usage operation has been performed, and then it is determined that each of the electronic cash and the points have been used. As another example, the reservation module 102 reserves each of the electronic cash and the points again when it is determined that the usage operation has been performed, and then it is determined that each of the electronic cash and the points have not been used. The process of reserving each of the electronic cash and the points per se is as described in the at least one embodiment.

According to Modification Example (4), with each of the electronic cash and the points reserved again based on a result of the determination of the use of each of the electronic cash and the points after it is determined that the usage operation has been performed, the combined payment is enabled again, and convenience of the user is increased.

(5) Further, for example, in the at least one embodiment, description has been given of the case in which the user specifies the upper limit of each of the electronic cash and the points in the combined payment, but an appropriate reserved amount that is likely to be used in the combined payment by the user may be estimated on the payment system S side. In Modification Example (5), description is given of a case in which the reserved amount is predicted from the usage history of the user in the past.

The payment system S according to Modification Example (5) includes the first determination module 109. The first determination module 109 determines the reserved amount of each of the electronic cash and the points based on the usage history of the user of the first payment means. For example, the first determination module 109 calculates a predicted used amount of the electronic money based on the usage history of the user. The first determination module 109 calculates, as the predicted used amount of the user, an average value of the used amounts included in the usage history of the user.

The used amounts considered in the calculation of the predicted used amount may be the used amounts in the entire period, or may be the used amounts in a latest partial period. The predicted used amount may be calculated for weekdays or holidays, or may be calculated for each day of the week. The predicted used amount may be calculated so that, as the date and time of use included in the usage history becomes newer, weighting becomes heavier. As another example, the predicted used amount may be predicted not by a formula but by a machine learning model.

The first determination module 109 determines the reserved amount so that, as the predicted used amount becomes larger, the reserved amount of each of the electronic cash and the points becomes larger. A relationship between the predicted used amount and the reserved amount may be determined in advance. That relationship may be determined by data having a table form or a formula form, or may be determined as a part of program code or a machine learning model. The first determination module 109 determines the reserved amount corresponding to the predicted used amount based on the relationship. For example, the first determination module 109 may determine, as the reserved amount, an amount obtained by subtracting the current balance of the electronic money from the predicted used amount, or may determine, as the reserved amount, a predetermined percent or a predetermined proportion of the predicted used amount.

The reservation module 102 reserves each of the electronic cash and the points based on the reserved amount determined by the first determination module 109. The method of determining the reserved amount is different from that of the at least one embodiment, but the method of reserving the determined reserved amount per se is the same as in the at least one embodiment.

According to Modification Example (5), each of the electronic cash and the points are reserved based on the reserved amount of each of the electronic cash and the points that is determined based on the usage history of the user of the electronic money so that each of the electronic cash and the points can be reserved by the reserved amount predicted to be required by the user, and convenience of the user is increased.

(6) Further, for example, an appropriate reserved amount by which the user is likely to use in the combined payment may be determined depending on the balance of the electronic money. As the balance of the electronic money becomes larger, the electronic cash and the points required in the combined payment become smaller. Thus, a reserved amount of each of the electronic cash and the points may be determined based on the balance of the electronic money.

The payment system S according to Modification Example (6) includes the second determination module 110. The second determination module 110 determines the reserved amount of each of the electronic cash and the points based on the balance of the electronic money. The second determination module 110 sets the reserved amount of each of the electronic cash and the points smaller as the balance of the electronic money becomes larger. The relationship between the balance of the electronic money and the reserved amount may be determined in advance. That relationship may be determined by data having a table form or a formula form, or may be determined as a part of program code or a machine learning model.

The second determination module 110 determines the reserved amount corresponding to the balance of the electronic money based on the relationship. For example, the second determination module 110 sets, when the balance of the electronic money is the threshold value or more, the reserved amount of each of the electronic cash and the points to 0 or an extremely small value. In contrast, for example, the second determination module 110 determines the reserved amount so that, when the balance of the electronic money is less than the threshold value, the reserved amount of each of the electronic cash and the points becomes smaller as the balance of the electronic money becomes larger.

The reservation module 102 reserves each of the electronic cash and the points based on the reserved amount determined by the second determination module 110. The method of determining the reserved amount is different from that of the at least one embodiment, but the method of reserving the determined reserved amount per se is the same as in the at least one embodiment.

According to Modification Example (6), each of the electronic cash and the points are reserved based on the reserved amount of each of the electronic cash and the points that is determined based on the balance of the electronic money so that each of the electronic cash and the points can be reserved by the reserved amount predicted to be required by the user, and convenience of the user is increased.

(7) Further, for example, as described in the at least one embodiment, the execution module 301 may charge the electronic money based on each of the electronic cash and the points, and execute the payment based on the charged electronic money. In this case, when a sound at the time when the electronic money is charged and a sound at the time when the payment is made are output separately from the store terminal 50, there is a fear in that the user may be confused, and hence those sounds may be combined into one sound in the case of the combined payment.

The payment system S according to Modification Example (7) further includes the output module 501. The output module 501 outputs a predetermined sound when the first payment means is charged and the payment is executed. It is assumed that a file of the sound is recorded in advance in the data storage unit 500 of the store terminal 50. The output module 501 outputs the sound from a loudspeaker of the store terminal 50. This sound is the same as a sound to be output when the normal payment is complete, but a sound dedicated to the combined payment may be prepared. When a notification that the payment in the combined payment is complete is received from the execution module 301, the output module 501 reproduces the above-mentioned file to output the sound.

According to Modification Example (7), the predetermined sound is output when the electronic money is charged and the payment is executed so that it is possible to prevent the user from being confused. For example, when the sound at the time of charging and the sound at the time of the payment in the combined payment are output separately, there is a fear in that the user may misunderstand that the combined payment is complete by the sound at the time of charging, and move the user terminal 70 away so that the combined payment becomes incomplete, but with the sounds being combined into one sound, it is possible to prevent the combined payment from becoming incomplete.

(8) Further, for example, when the user can use a plurality of payment means each of which is usable as any one of the first payment means and the second payment means, payment means that is likely to be used by the user may be set as the first payment means based on the usage history of the user. As another example, the user may be able to freely specify a combination of the first payment means and the second payment means from among the plurality of payment means.

The payment system S according to Modification Example (8) further includes the third determination module 111. The third determination module 111 determines the first payment means and the at least one second payment means from among the plurality of payment means based on the usage history of the user. The usage history is the same as that shown in FIG. 8, but it is assumed, in Modification Example (8), that there is a usage history for each of the plurality of payment means. The usage history of each payment means is updated every time the payment means is used.

For example, the third determination module 111 identifies, based on the usage history of each of the plurality of payment means, payment means most used by the user. The third determination module 111 determines, as the first payment means, the payment means most used by the user, and determines other payment means as the second payment means. As another example, the third determination module 111 identifies, based on the usage history of each of the plurality of payment means, payment means relatively used by the user. The third determination module 111 determines, as the first payment means, the payment means relatively used by the user, and determines other payment means as the second payment means. The payment means most used by the user or the payment means relatively used by the user may be identified depending on the store which the user has entered. In other words, the payment means most used or the payment means relatively used at the store which the user is currently in may be determined based on the usage history.

According to Modification Example (8), the first payment means and the at least one second payment means are determined from among the plurality of payment means based on the usage history of the user, thereby achieving the combined payment in which payment means easily used by the user is used mainly, and increasing convenience of the user.

(9) Further, for example, a payment application for making the payment request may be installed in the user terminal 70 of the user of the electronic money. The payment application is an electronic payment application. The payment application may allow use of a plurality of payment means. In this case, payment means specified as a main method of payment by the user may be the first payment means, and other payment means may be the second payment means.

When the payment application enters a predetermined state, the reservation module 102 may reserve each of the electronic cash and the points. The predetermined state means that the payment application is started, or that a predetermined process is executed by the started payment application. This process is a process to be executed before the payment request, and is, for example, a process of displaying an image (code C40 of FIG. 17) required for the payment.

FIG. 17 is a diagram for illustrating an example of how the user uses the combined payment via the payment application. As illustrated in FIG. 17, when the user selects an icon 130 of the payment application on a menu screen G3 of the user terminal 70, the user terminal 70 starts the payment application. The user terminal 70 transmits, to the electronic money server 10, a start notification indicating that the payment application has been started. The start notification includes a user ID and the current position of the user. After the start notification is transmitted, a predetermined login process is executed.

When the start notification is received, the reservation module 102 of the electronic money server 10 reserves each of the electronic cash and the points to generate the reservation information and update the reservation information database DB2. The reservation module 102 transmits the reservation information to the member store server 40 of the store corresponding to the current position of the user. When the reservation information is received, the holding module 401 of the member store server 40 holds the reservation information in the data storage unit 400. As described above, before a payment screen G4 is displayed on the user terminal 70, each of the electronic cash and the points are reserved for the combined payment.

The reading unit 56 of the store terminal 50 in Modification Example (9) includes a code reader or a camera. When the reading unit 56 of the store terminal 50 reads the code C40 on the payment screen G4, the store terminal 50 transmits the payment request to the member store server 40. The reception module 402 of the member store server 40 receives the payment request based on the payment application. When the payment request based on the payment application is received, the execution module 301 of the TCC server 30 executes the payment. Modification Example (9) is different from the at least one embodiment in that the payment request is transmitted with the payment application being a starting point, but a flow of the payment after the payment request is transmitted per se is the same as in the at least one embodiment.

As illustrated in FIG. 17, after the combined payment is executed, a payment completion screen G5 showing the total amount of the combined payment and a payment breakdown of the respective payment means is displayed on the user terminal 70. When the payment completion screen G5 is displayed, the reservation information is released. When the user terminal 70 is switched to the sleep mode and displays a sleep screen G6 (that is, enters a state in which nothing is displayed) without the user executing the combined payment, the reservation information may be released. In addition, for example, when the payment application is moved to the background, when the payment application is ended, or when a screen (for example, a help screen on which the code C40 is not displayed) other than the payment screen G4 of screens of the payment application is displayed, the reservation information may be released.

In Modification Example (9), the description has been given of the case in which the code displayed on the user terminal 70 is read by the reading unit 56 of the store terminal 50, but a code displayed on the display unit 55 of the store terminal 50 may be read by the user terminal 70 to transmit the payment request. In this case, the user terminal 70 includes a camera. For example, when the payment application of the user terminal 70 is started, or when the camera is started after that, each of the electronic cash and the points may be reserved. In addition, for example, the combined payment is also applicable to payment executed by reading, by the user terminal 70, a code posted in the store. Also in this case, when the payment application of the user terminal 70 is started, or when the camera is started after that, each of the electronic cash and the points may be reserved.

Further, for example, the combined payment is also applicable to payment executed by the user inputting the total amount to the user terminal 70 without causing reading by the store terminal 50 or the user terminal 70. Also in this case, when the payment application of the user terminal 70 is started, or when, for example, a screen for inputting the total amount is displayed after that, each of the electronic cash and the points may be reserved. In addition, for example, the combined payment is also applicable to payment in which, instead of using an image such as the code, information required for the payment is exchanged between the store terminal 50 and the user terminal 70 with use of near-field wireless communication. Also in this case, when the payment application of the user terminal 70 is started, or when the communication unit 73 is started, each of the electronic cash and the points may be reserved.

According to Modification Example (9), the payment using the payment application can be completed swiftly. For example, in a case in which the user uses the electronic money via the payment application, even when the balance of the electronic money is short, the combined payment in which the electronic cash and the points are used in combination can be made. As a result, it becomes unnecessary for the user to charge the electronic money, or call other payment means, and hence the payment can be completed swiftly. Further, with the use of each of the electronic cash and the points that have been reserved in advance, the payment can be completed more swiftly.

(10) Further, for example, the modification examples described above may be combined.

Further, for example, entry of the user may be detected by providing a camera at the entrance of the store and performing face authentication. Still further, for example, with no upper limit for the combined payment, each of the electronic cash and the points may be reserved in full, or a predetermined percent or a predetermined proportion of the balance of each of the electronic cash and the points may be reserved. Yet further, for example, the store terminal 50 may be a full-self register, or a register operated not by the user but entirely by a clerk. Yet further, for example, the entry notification may be transmitted when the user holds the user terminal 70 not over the gate terminal 60, but over a charging machine installed at the entrance of the store.

Further, for example, the electronic money may be used not via the user terminal 70 but via a physical card. In other words, the payment in the combined payment may be executed not only in the case in which the user uses the electronic money via the user terminal 70, but also in the case in which the user uses the electronic money via the physical card. Still further, for example, the physical card may be a magnetic card. In other words, information inside is not required to be acquired by near-field wireless communication, but may be acquired magnetically. In addition, for example, the payment in the combined payment may be executed when the user visits the store empty-handed and the payment is executed by biometric authentication such as face authentication.

Further, for example, the payment system S is applicable not only to payment at a real store, but also to online payment. For example, when the user operates the user terminal 70 to do online shopping, the combined payment using the electronic money and each of the electronic cash and the points may be allowed. In this case, the entry operation may correspond to when the shopping app is started. At this timing, each of the electronic cash and the points may be reserved. Each of the electronic cash and the points may be reserved at a timing when an item is put in a shopping cart, or at another timing such as a timing when a screen for confirming the payment is displayed. In addition, the combined payment by the payment system S is applicable to payment in any situation that is a payment situation other than shopping (for example, hotel reservation, application for an insurance, payment for communication bills, or payment for an application).

Further, for example, the functions may be implemented by at least one computer included in the payment system S. The functions may be implemented by one computer. Further, for example, the function described as being implemented by the electronic money server 10 may be implemented by the member store server 40. Still further, for example, the function described as being implemented by the member store server 40 may be implemented by the electronic money server 10. Yet further, for example, the external DC server 20 and the TCC server 30 may be omitted, or the electronic money server 10 may have all the functions.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A payment system, comprising:
    a user terminal comprising an IC chip configured to store a first ID of first payment means that is electronic payment means,
    a gate terminal comprising a first reader configured to read the first ID from the IC chip of the user terminal through near-field wireless communication,
    a payment terminal comprising a second reader configured to read the first ID from the IC chip of the user terminal through near-field wireless communication, and
    a data storage configured to store a date base that stores the first ID and at least one second ID of second payment means that is electronic payment means,
    wherein the gate terminal transmits the first ID when the gate terminal read the first ID from the IC chip,
    wherein the payment terminal transmits the first ID when the payment terminal read the first ID from the IC chip after the gate terminal transmits the first ID to a server, and
    wherein the payment system further comprises at least one processor configured to:
    receive the first ID from the gate terminal,
    reserve, before a payment request for the first payment means from the payment terminal is received, at least one second payment means associated with the first payment means based on the received first ID, the stored first ID, and the stored at least one second ID;
    receive the payment request from the payment terminal; and
    execute, when the payment request is received from the payment terminal, payment based on the first payment means and the reserved at least one second payment means.

2. The payment system according to claim 1, wherein the at least one processor is configured to:
    acquire and hold, before the payment request is received, reservation information on the at least one second payment means; and
    execute, when the payment request is received, the payment based on the held reservation information without requesting the reservation information.

3. The payment system according to claim 1, wherein the at least one processor is configured to:
    receive the payment request when, after a predetermined first operation is performed by a user of the first payment means, a predetermined second operation is performed by the user;
    determine whether the predetermined first operation has been performed by the user; and
    reserve the at least one second payment means when it is determined that the predetermined first operation has been performed.

4. The payment system according to claim 1, wherein the at least one processor is configured to:
    determine whether a reservation time for the at least one second payment means has arrived based on a usage history of a user of the first payment means; and
    reserve the at least one second payment means when it is determined that the reservation time has arrived.

5. The payment system according to claim 1, wherein the at least one processor is configured to:
    determine, based on a current position of a user of the first payment means, whether the user has moved to or approached a location at which the first payment means is usable; and
    reserve the at least one second payment means when it is determined that the user has moved to or approached the location.

6. The payment system according to claim 1, wherein the at least one processor is configured to:
    determine, after the at least one second payment means is reserved, whether a predetermined third operation for using the at least one second payment means has been performed by a user of the first payment means; and
    release the at least one second payment means when it is determined that the predetermined third operation has been performed.

7. The payment system according to claim 6, wherein the at least one processor is configured to:
    determine the use of the at least one second payment means after it is determined that the predetermined third operation has been performed; and
    reserve the at least one second payment means again based on a result of the determination.

8. The payment system according to claim 1, wherein the at least one processor is configured to reserve the at least one second payment means based on a reserved amount of the at least one second payment means specified by a user of the first payment means.

9. The payment system according to claim 1, wherein the at least one processor is configured to:
    determine a reserved amount of the at least one second payment means based on a usage history of a user of the first payment means; and
    reserve the at least one second payment means based on the reserved amount.

10. The payment system according to claim 1, wherein the at least one processor is configured to:
    determine a reserved amount of the at least one second payment means based on a balance of the first payment means; and
    reserve the at least one second payment means based on the reserved amount.

11. The payment system according to claim 1, wherein the at least one processor is configured to:
    reserve a plurality of the second payment means; and
    execute the payment based on order of precedence set for each of the plurality of second payment means.

12. The payment system according to claim 1, wherein the at least one processor is configured to:
    charge the first payment means based on the at least one second payment means, and execute the payment based on the charged first payment means; and
    output a predetermined sound when the first payment means is charged and the payment is executed.

13. The payment system according to claim 1,
wherein a user is allowed to use a plurality of payment means each of which is usable as any one of the first payment means and the at least one second payment means, and
wherein the at least one processor is configured to determine the first payment means and the at least one second payment means from among the plurality of payment means based on a usage history of the user.

14. The payment system according to claim 1,
wherein a payment application for making the payment request is installed in a user terminal of a user of the first payment means, and
wherein the at least one processor is configured to:
reserve the at least one second payment means when the payment application enters a predetermined state;
receive the payment request based on the payment application; and
execute the payment when the payment request based on the payment application is received.

15. A payment method performed by at least one processor and comprising:
receiving a first ID from a gate terminal;
reserving, before a payment request for a first payment means from a payment terminal is received, at least one second payment means associated with the first payment means based on a received first ID, a stored first ID, and a stored at least one second ID;
receiving the payment request from the payment terminal;
executing, when the payment request is received from the payment terminal, payment based on the first payment means and the reserved at least one second payment means;
wherein a user terminal comprising an IC chip configured to store the first ID of the first payment means that is electronic payment means;
wherein the gate terminal comprising a first reader configured to read the first ID from the IC chip of the user terminal through near-field wireless communication;
wherein the payment terminal comprising a second reader configured to read the first ID from the IC chip of the user terminal through near-field wireless communication;
wherein a data storage configured to store a database that stores the first ID and at least one second ID of second payment means that is electronic payment means;
wherein the gate terminal transmits the first ID when the gate terminal read the first ID from the IC chip; and
wherein the payment terminal transmits the first ID when the payment terminal read the first ID from the IC chip after the gate terminal transmits the first ID to a server.

16. A non-transitory information storage medium having stored thereon a program for causing a computer to:
receive a first ID from a gate terminal,
receive a payment request from a payment terminal;
execute, when a payment request for first payment means is received, payment based on the first payment means and at least one second payment means which has been reserved before the payment request from the payment terminal is received, and is associated with the first payment means based on a received first ID, a stored first ID, and a stored at least one second ID,
wherein a user terminal comprising an IC chip configured to store the first ID of the first payment means that is electronic payment means;
wherein the gate terminal comprising a first reader configured to read the first ID from the IC chip of the user terminal through near-field wireless communication;
wherein the payment terminal comprising a second reader configured to read the first ID from the IC chip of the user terminal through near-field wireless communication;
wherein a data storage configured to store a database that stores the first ID and at least one second ID of second payment means that is electronic payment means;
wherein the gate terminal transmits the first ID when the gate terminal read the first ID from the IC chip; and
wherein the payment terminal transmits the first ID when the payment terminal read the first ID from the IC chip after the gate terminal transmits the first ID to a server.

\* \* \* \* \*